(12) United States Patent
Takeuchi et al.

(10) Patent No.: US 10,303,023 B2
(45) Date of Patent: May 28, 2019

(54) LIQUID CRYSTAL DISPLAY DEVICE AND MANUFACTURING METHOD THEREOF AND ELECTRONIC DEVICE

(71) Applicant: Japan Display Inc., Tokyo (JP)

(72) Inventors: Shumpei Takeuchi, Tokyo (JP); Akio Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/107,354

(22) Filed: Aug. 21, 2018

(65) Prior Publication Data

US 2018/0356698 A1 Dec. 13, 2018

Related U.S. Application Data

(63) Continuation of application No. 15/287,278, filed on Oct. 6, 2016, now Pat. No. 10,108,062, which is a
(Continued)

(30) Foreign Application Priority Data

Jul. 27, 2012 (JP) .................................. 2012-166579

(51) Int. Cl.
*G02F 1/1368* (2006.01)
*G02F 1/1362* (2006.01)
(Continued)

(52) U.S. Cl.
CPC ...... *G02F 1/136227* (2013.01); *G02F 1/1368* (2013.01); *G02F 1/13439* (2013.01);
(Continued)

(58) Field of Classification Search
CPC ............. G02F 1/136227; G02F 1/1368; G02F 1/133345; G02F 1/134363
See application file for complete search history.

(56) References Cited

U.S. PATENT DOCUMENTS

| 4,636,038 A | 1/1987 | Kitahara |
| 7,538,845 B2 | 5/2009 | Hasegawa et al. |

(Continued)

FOREIGN PATENT DOCUMENTS

| JP | 2001-174844 | 6/2001 |
| JP | 2001-272698 | 10/2001 |

(Continued)

OTHER PUBLICATIONS

Notification of Reasons of Refusal issued in connection with Japanese Patent Application No. 2012-166579, dated Apr. 28, 2015. (6 pages).

*Primary Examiner* — Thanh Nhah P Nguyen
(74) *Attorney, Agent, or Firm* — K&L Gates LLP

(57) ABSTRACT

In a liquid crystal display device, an upper electrode and a drain electrode are reliably connected to each other electrically, with preventing or suppressing an occurrence of an aperture ratio loss, or sufficiently reducing a parasitic capacitance between the scanning line and the lower electrode. An interlayer resin film is formed on a drain electrode, with a hole being formed on the interlayer resin film, and on the drain electrode exposed to a bottom portion of the hole, an island-shaped electrode is formed separately from a lower electrode. Moreover, on the island-shaped electrode, an inter-electrode insulating film is formed, a contact hole is formed in the inter-electrode insulating film, and an upper electrode is formed on the island-shaped electrode exposed to a bottom portion of the contact hole.

7 Claims, 20 Drawing Sheets

Related U.S. Application Data continuation of application No. 14/862,315, filed on Sep. 23, 2015, now Pat. No. 9,482,918, which is a continuation of application No. 13/944,513, filed on Jul. 17, 2013, now Pat. No. 9,188,821.

(51) Int. Cl.
*G02F 1/1333* (2006.01)
*G02F 1/1343* (2006.01)
*H01L 27/12* (2006.01)
*G02F 1/136* (2006.01)

(52) U.S. Cl.
CPC .. *G02F 1/133345* (2013.01); *G02F 1/134363* (2013.01); *G02F 1/136286* (2013.01); *H01L 27/124* (2013.01); *G02F 1/136213* (2013.01); *G02F 2001/13606* (2013.01); *G02F 2001/134372* (2013.01); *G02F 2201/121* (2013.01); *G02F 2201/122* (2013.01); *G02F 2201/123* (2013.01); *G02F 2201/40* (2013.01)

(56) References Cited

U.S. PATENT DOCUMENTS

| | | | |
|---|---|---|---|
| 7,768,614 B2 | 8/2010 | Hasegawa et al. | |
| 8,294,863 B2 | 10/2012 | Ninomiya et al. | |
| 2010/0002178 A1* | 1/2010 | Ninomiya | G02F 1/136227 349/138 |
| 2012/0069259 A1 | 3/2012 | Oh et al. | |

FOREIGN PATENT DOCUMENTS

| | | |
|---|---|---|
| JP | 2006-126602 | 5/2006 |
| JP | 2010-014975 | 1/2010 |

\* cited by examiner

LIQUID CRYSTAL DISPLAY DEVICE AND MANUFACTURING METHOD THEREOF AND ELECTRONIC DEVICE

CROSS REFERENCES TO RELATED APPLICATIONS

The present application is a continuation of U.S. patent application Ser. No. 15/287,278, filed on Oct. 6, 2016, which application is a continuation of U.S. patent application Ser. No. 14/862,315, filed on Sep. 23, 2015, and issued as U.S. Pat. No. 9,482,918 on Nov. 1, 2016, which application is a continuation of U.S. patent application Ser. No. 13/944,513, filed on Jul. 17, 2013, and issued as U.S. Pat. No. 9,188,821 on Nov. 17, 2015, which application claims priority to Japanese Priority Patent Application JP 2012-166579 filed in the Japan Patent Office on Jul. 27, 2012, the entire content of which is hereby incorporated by reference.

BACKGROUND

The present invention relates to a liquid crystal display apparatus, and particularly relates to a liquid crystal display apparatus provided with a plurality of pixels.

Since a liquid crystal display apparatus has such features as light weight, compact size and low power consumption in comparison with a CRT (Cathode Ray Tube), it is used in various types of electronic device as a display. A liquid crystal display apparatus displays an image by changing an orientation of liquid crystal molecules aligned in a predetermined direction by an electric field and controlling the amount of light transmission through a liquid crystal layer.

A liquid crystal display apparatus has a pair of substrates including, for example, an array substrate and a color filter substrate. In the array substrate, for example, thin film transistor (TFT) as switching elements are formed in an array so as to correspond to each of the pixels of the liquid crystal display apparatus. In the color filter substrate, color filters are formed so as to correspond to each of the pixels of the liquid crystal display apparatus. A liquid crystal layer is filled in a space between the array substrate and the color filter substrate, and an electric field applied to the liquid crystal layer is changed by switching the TFT in each pixel.

As a method of applying an electric field to a liquid crystal layer, the method utilizing a vertical electric field scheme and the method utilizing a lateral electric field scheme have been known.

In the liquid crystal display apparatus employing the lateral electric field scheme, for example, on a liquid crystal layer side of either one of a pair of substrates including an allay substrate and a color filter substrate, a pair of electrodes are provided so as to be insulated from each other, and an approximately lateral electric field is applied to the liquid crystal molecules. As the liquid crystal display apparatus employing the lateral electric field scheme, the apparatus of an IPS (In-Plane Switching) mode in which the pair of electrodes is not overlapped with each other when seen in a plan view and the apparatus of an FFS (Fringe Field Switching) mode in which the electrodes are overlapped with each other have been known.

Of these, in the liquid crystal display apparatus of the FFS mode, paired electrodes including a common electrode and a pixel electrode are each disposed on respectively different layers via an insulating film, a slit-like aperture is provided in the common electrode or the pixel electrode on the liquid crystal layer side, and an approximately lateral electric field passing through this slit-like aperture is applied to the liquid crystal layer. Since the liquid crystal display apparatus of the FFS mode has such effects of wide viewing angle and improved image contrast, it has been used more in recent years.

In each of various types of liquid crystal display devices including such a liquid crystal display device of the FFS mode, surfaces of a scanning line, a signal line and a TFT formed on an array substrate are covered with an interlayer resin film, and a pixel electrode is formed on the interlayer resin film. Moreover, a contact hole that penetrates the interlayer resin film to reach a drain electrode of the TFT is formed on the interlayer resin film, and the pixel electrode and the drain electrode are electrically connected with each other via the contact hole. Furthermore, a light-shielding unit is formed on a portion between pixels on a liquid crystal layer side of a color filter substrate.

Japanese Patent Application Laid-Open Publication No. 2001-174844 (Patent Document 1) and Japanese Patent Application Laid-Open Publication No. 2001-272698 (Patent Document 2) have described a technique in which, by forming a pixel electrode after forming a contact hole that penetrates an interlayer resin film on a drain electrode to reach the drain electrode, the pixel electrode and the drain electrode are electrically connected with each other.

SUMMARY

In manufacturing processes of the above-mentioned liquid crystal display device of the FFS mode, a lower electrode made of a transparent conductive material and an upper electrode having a slit-like aperture are formed on the surface of the interlayer resin film interposing an inter-electrode insulating film therebetween. The specific manufacturing process includes, for example, steps in which a hole that penetrates the interlayer resin film on the drain electrode to reach the drain electrode is formed, and after a lower electrode has been formed on the interlayer resin film, an inter-electrode insulating film is formed on the drain electrode exposed to a bottom portion of the hole as well as on the lower electrode. Next, the inter-electrode insulating film is subjected to an etching process so that a contact hole is formed, and an upper electrode is formed on the drain electrode exposed to a bottom portion of the contact hole.

In the above-mentioned manufacturing process, upon forming the lower electrode, the conductive film is formed on the interlayer resin film, and the aperture is formed on the lower electrode. When the aperture to be formed on the lower electrode is formed with a protrusion from a region in which a light-shielding unit is formed when viewed in its plan view, due to a limitation in a pixel layout, a failure of displaying an image is posed since no lower electrode exists in the protruding region, and thus the aperture ratio of the pixels is actually reduced. That is, a problem arises in which an aperture ratio loss is caused. Moreover, when the area of a portion in which the scanning line (gate wiring) and the lower electrode are overlapped with each other is not sufficiently reduced due to the limitation in a pixel layout, another problem arises in which a parasitic capacitance between the scanning line (gate wiring) and the lower electrode is not sufficiently reduced.

To prevent or suppress the occurrence of such an aperture ratio loss or to sufficiently reduce the parasitic capacitance between the scanning line (gate wiring) and the lower electrode, a method may be proposed in which the aperture to be formed on the lower electrode is formed at a position deviated from a position of the drain electrode.

However, in the above-mentioned manufacturing process, upon etching the inter-electrode insulating film to form the contact hole, the cross-sectional shape of the contact hole is prone to be a so-called reverse-tapered shape. When the contact hole has the reverse-tapered shape in its cross-sectional shape, both of an upper electrode formed on a side surface portion of the contact hole and an upper electrode formed on a bottom portion of the contact hole fail to be connected to each other as an integral unit, thereby making it difficult to reliably connect the upper electrode and the drain electrode to each other electrically. Even when the aperture to be formed on the lower electrode is formed at a position deviated from the position of the drain electrode, the cross-sectional shape of the contact hole is prone to be the reverse-tapered shape, thereby making it difficult to reliably connect the upper electrode and the drain electrode to each other electrically.

The present invention has been made to solve the above-mentioned conventional problems, and its preferred aim is to provide a liquid crystal display device in which an upper electrode and a drain electrode are reliably connected to each other electrically with preventing or suppressing occurrence of an aperture ratio loss, or with sufficiently reducing parasitic capacitance between a scanning line and a lower electrode.

The typical ones of the inventions disclosed in the present application will be briefly described as follows.

A liquid crystal display device in accordance with a typical embodiment includes an interlayer resin film formed on a drain electrode that is formed on an array electrode, and a hole is formed in the interlayer resin film, with an island-shaped electrode being formed on the drain electrode exposed to the hole separately from a lower electrode. Moreover, on the island-shaped electrode, an inter-electrode insulating film is formed, and a contact hole is formed in the inter-electrode insulating film, with an upper electrode being formed on the island-shaped electrode exposed to a bottom portion of the contact hole.

Moreover, a method of manufacturing a liquid crystal display device in accordance with a typical embodiment includes steps of forming an interlayer resin film on a drain electrode formed on an array substrate, forming a hole in the interlayer resin film, and forming a conductive film on the drain electrode exposed to the hole. By carrying out a patterning process on the conductive film, an island-shaped electrode is formed separately from the lower electrode. Next, an inter-electrode insulating film is formed on the island-shaped electrode, a contact hole is formed in the inter-electrode insulating film, and an upper electrode is formed on the island-shaped electrode exposed to a bottom portion of the contact hole.

The effects obtained by typical aspects of the present invention will be briefly described below.

According to the typical embodiments, the upper electrode and the drain electrode can be reliably connected with each other electrically with preventing or suppressing an occurrence of an aperture ratio loss, or with sufficiently reducing parasitic capacitance between the scanning line and the lower electrode.

Additional features and advantages are described herein, and will be apparent from the following Detailed Description and the figures.

DETAILED DESCRIPTION

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted. Also, in the following embodiments, the descriptions of the same or similar components are not repeated in principle except when particularly necessary.

Furthermore, in some drawings used in the following embodiments, hatching is omitted even in a cross-sectional view so as to make the drawings easy to see. Also, hatching is used even in a plan view so as to make the drawings easy to see.

First Embodiment

<Liquid Crystal Display Apparatus>

A liquid crystal display apparatus 10 of the first embodiment of the present invention will be described with reference to drawings.

First, a general configuration of the liquid crystal display apparatus 10 of the first embodiment will be described with reference to FIG. 1 to FIG. 3.

Figure 1:
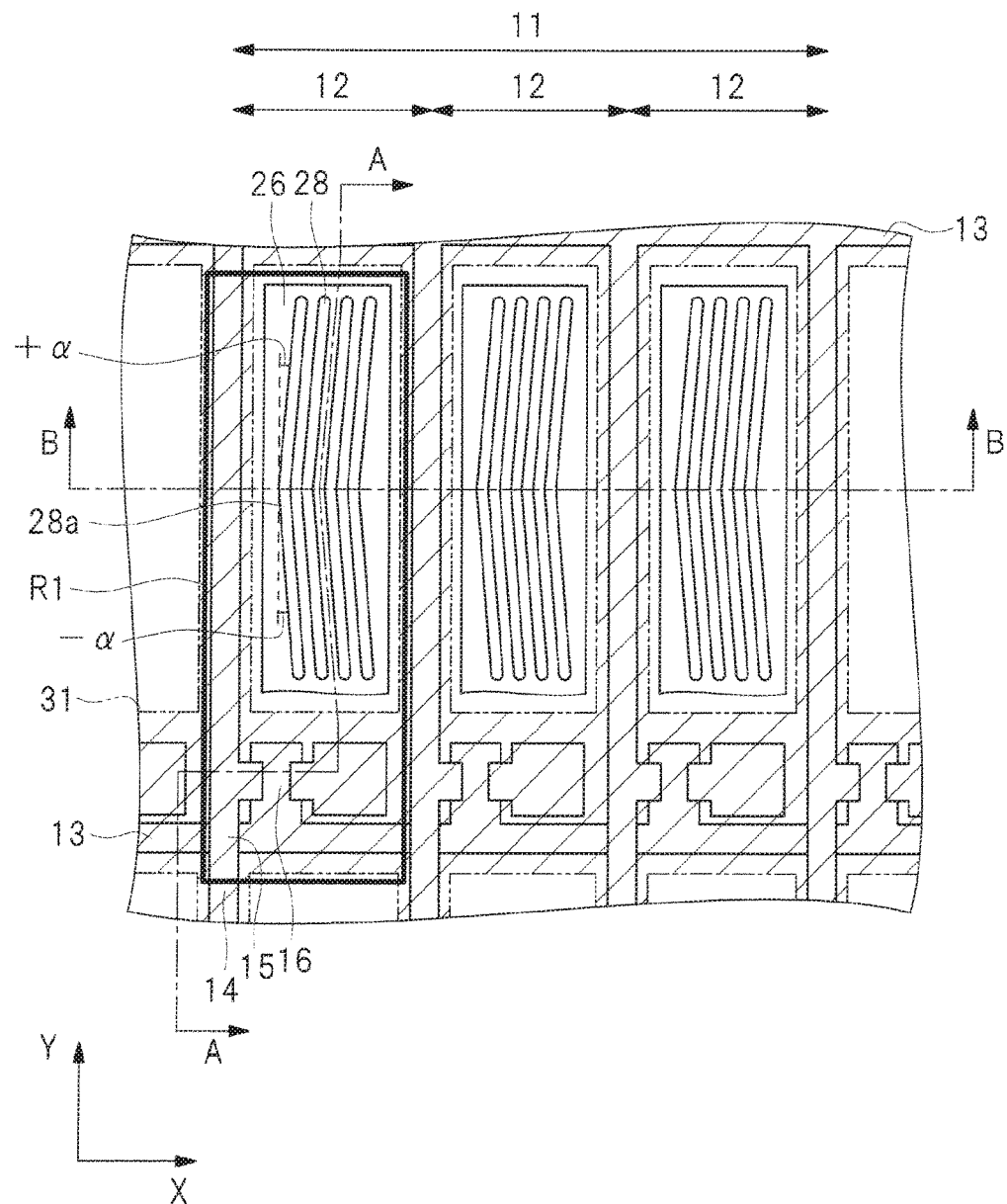
FIG. 1 is a plan view showing an outline of a liquid crystal display apparatus of the first embodiment.

FIG. 1 is a plan view showing an outline of the liquid crystal display apparatus of the first embodiment. FIG. 2 is a cross-sectional view taken along the line A-A in FIG. 1. FIG. 3 is a cross-sectional view taken along the line B-B in FIG. 1.

For example, the liquid crystal display apparatus 10 of the first embodiment is a liquid crystal display apparatus of an FFS mode utilizing a lateral electric field scheme for color display, and is provided with a plurality of pixels 11 as shown in FIG. 1. Also, in the configuration of the liquid crystal display apparatus 10 of the first embodiment, as shown in FIG. 2 and FIG. 3, a liquid crystal layer LC is sandwiched between an allay substrate AR and a color filter substrate CF. More specifically, the liquid crystal display apparatus 10 includes the array substrate AR, the color filter substrate CF arranged so as to be opposed to the array substrate AR, and the liquid crystal layer LC sandwiched between the array substrate AR and the color filter substrate CF. The pixels 11 operate in the FFS mode and can use the liquid crystal layer LC in common. The plurality of pixels 11 are arranged in a row direction (X axis direction of FIG. 1) and a column direction (Y axis direction of FIG. 1). The pixel 11 is made up of, for example, subpixels 12 for representing three colors of red (R), green (G) and blue (B), and the color of each pixel 11 is determined by the mixture of the lights of these colors.

FIG. 1 shows an example of three-color display, but the liquid crystal display apparatus 10 is not limited to the three-color display. For example, the pixel 11 may be made up of the subpixels 12 of two or less colors. Alternatively, the pixel 11 may be made up of the subpixels 12 of four or more colors (the same is true in the following embodiments).

In the specification of the present application, a region R1 is defined as a region corresponding to one subpixel 12, but one subpixel may be defined in a different manner as long as the definition is made so that periodical structure is repeated for each subpixel.

Also, FIG. 1 shows the state in which the part of the color filter substrate CF other than the photo spacer (spacer portion) 34 (see FIG. 2) is removed (transparent) for the sake of easy understanding (the same is true in FIG. 4 to FIG. 6, FIG. 13 and FIG. 15 to FIG. 18 below). Furthermore, FIG. 1 shows the state in which a gate insulating film 21 (see FIG. 2), a semiconductor layer 22 (see FIG. 2), an interlayer resin film (planarization film) 23 (see FIG. 2), a lower electrode 24 (see FIG. 2) and an inter-electrode insulating film 25 (see FIG. 2) of the array substrate AR are removed (transparent) for the sake of easy understanding (the same is true in FIG. 4 to FIG. 6, FIG. 13 and FIG. 15 to FIG. 18 below). Moreover, in FIG. 1, an outer periphery of a light shielding portion 31 (see FIG. 2) provided in the color filter substrate CF is illustrated by a two-point chain line for the sake of easy understanding (the same is true in FIG. 4 to FIG. 6 and FIG. 16 to FIG. 18 below). In addition, in FIG. 1, with respect to the photo spacer (spacer portion) 34, only the outer periphery thereof is illustrated by a solid line for the sake of easy understanding (the same is true in FIG. 4, FIG. 5 and FIG. 16 to FIG. 18 below).

As shown in FIG. 1, the subpixel 12 has a scanning line (gate wiring) 14 and a signal line (source wiring) 14 on the array substrate AR. The scanning line (gate wiring) 13 extends in the X axis direction and is made of, for example, opaque metal such as aluminum (Al) or molybdenum (Mo). The signal line (source wiring) 14 extends in the Y axis direction and is made of, for example, opaque metal such as aluminum (Al) or molybdenum (Mo). Also, the subpixel 12 has a TFT (Thin-Film Transistor) 16 provided on the array substrate AR and at an intersecting portion 15 of the scanning line (gate wiring) 13 and the signal line (source wiring) 14.

In the specification of the present application, the intersecting portion 15 is defined as including a portion at which the scanning line (gate wiring) 13 and the signal line (source wiring) 14 intersect and a portion around it, and it includes also the region in which the TFT (Thin-Film Transistor) 16 having a drain electrode DE is formed.

Also, the Y axis direction is a direction intersecting with the X axis direction, and the Y axis direction is preferably a direction orthogonal to the X axis direction.

Figure 2:
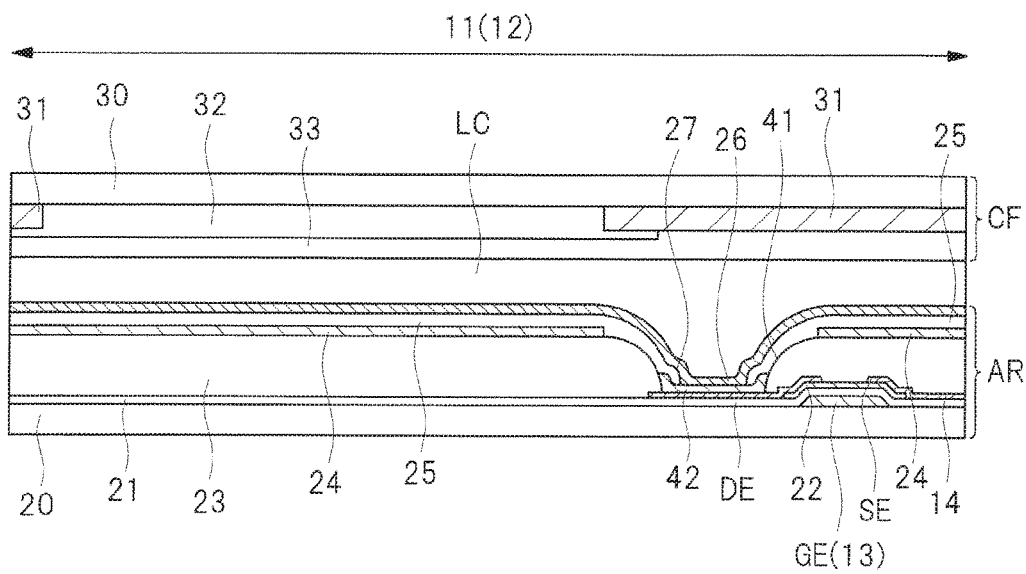
FIG. 2 is a cross-sectional view taken along the line A-A in FIG. 1.
Figure 3:
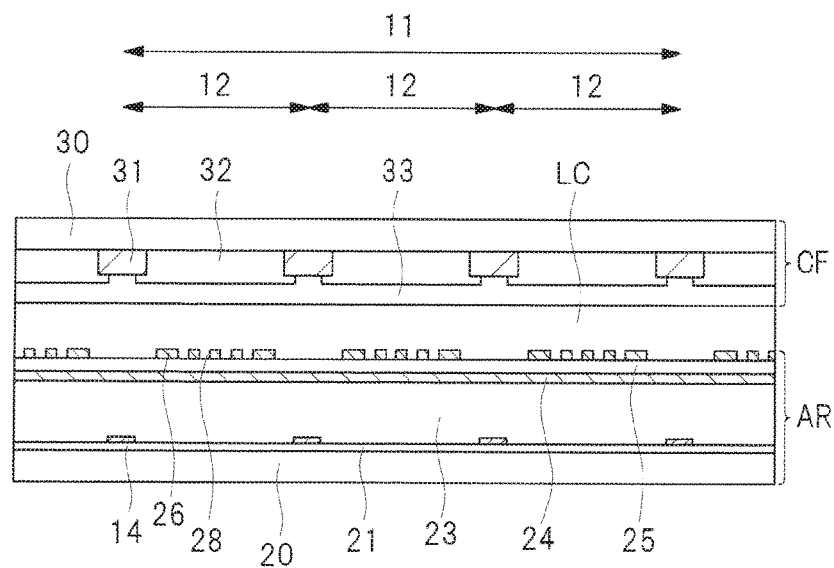
FIG. 3 is a cross-sectional view taken along the line B-B in FIG. 1.

As shown in FIG. 2 and FIG. 3, the array substrate AR has a first transparent substrate 20 as a base substrate. The first transparent substrate 20 is made of a transparent insulating material such as glass, quartz, or plastic. Note that, in FIG. 2 and FIG. 3, hatchings of the first transparent substrate 20, the gate insulating film 21, the interlayer resin film (planarization film) 23 and the inter-electrode insulating film 25 are omitted so as to make the drawings easy to see (the same is true in FIG. 7 and FIG. 8 to FIG. 10 below).

On the first transparent substrate 20, the scanning line (gate wiring) 13 is formed on a side facing the liquid crystal layer LC. As described above, the scanning line (gate wiring) 13 extends in the row direction (X axis direction) and is made of, for example, opaque metal such as aluminum (Al) or molybdenum (Mo). A gate electrode GE extends from the scanning line (gate wiring) 13.

A transparent gate insulating film 21 made of, for example, silicon nitride or silicon oxide is stacked (formed) so as to cover the scanning line (gate wiring) 13 and the gate electrode GE. Also, on the gate insulating film 21 overlapped with the gate electrode GE when seen in a plan view, a semiconductor layer 22 made of, for example, amorphous silicon or polycrystalline silicon is formed.

On the gate insulating film 21, the signal line (source wiring) 14 is formed. As described above, the signal line (source wiring) 14 extends in the column direction (Y axis direction) and is made of, for example, opaque material such as aluminum (Al) or molybdenum (Mo). A source electrode SE extends from the signal line (source wiring) 14. The source electrode SE is partially in contact with a surface of the semiconductor layer 22.

On the gate insulating film 21, the drain electrode DE made of the same material as the signal line (source wiring) 14 and formed simultaneously therewith is provided. The drain electrode DE is disposed near the source electrode SE and is partially in contact with the semiconductor layer 22.

When seen in a plan view, the region surrounded by the adjacent two scanning lines (gate wiring) 13 and the adjacent two signal lines (source wiring) 14 delimits the subpixel 12. More specifically, the subpixel 12 is demarcated by the adjacent two scanning lines (gate wiring) 13 and the adjacent two signal lines (source wiring) 14. Then, in the subpixel 12, the gate electrode GE, the gate insulating film 21, the semiconductor layer 22, the source electrode SE and the drain electrode DE constitute the TFT 16 serving as a switching element.

Further, the interlayer resin film (planarization film) 23 made of, for example, a transparent resin material such as photoresist is stacked (formed) so as to cover exposed portions of the signal line (source wiring) 14, the TFT 16 and the gate insulating film 21. More specifically, the interlayer resin film (planarization film) 23 is formed on the TFT 16 including the drain electrode DE. The interlayer resin film (planarization film) 23 covers the exposed portions of the signal line (source wiring) 14, the TFT 16 and the gate insulating film 21, and planarizes uneven surfaces of the signal line (source wiring) 14, the TFT 16 and the gate insulating film 21.

Note that, as an underlayer of the interlayer resin film (planarization film) 23, for example, a transparent passivation film made of silicon nitride or silicon oxide can be stacked (formed) so as to cover all or part of the exposed portions of the signal line (source wiring) 14, the TFT 16 and the gate insulating film 21. Furthermore, the interlayer resin film (planarization film) 23 can be stacked (formed) so as to cover the passivation film.

The lower electrode 24 made of a transparent conductive material such as ITO (Indium Tin Oxide) or IZO (Indium Zinc Oxide) is formed so as to cover the interlayer resin film (planarization film) 23. The lower electrode 24 is integrally and continuously formed in an approximately entire transparent region including the region of each subpixel 12, and operates as a common electrode.

The transparent inter-electrode insulating film 25 made of, for example, silicon nitride or silicon oxide is stacked (formed) so as to cover the lower electrode 24. Also, the upper electrode 26 made of, for example, a transparent conductive material such as ITO or IZO is formed so as to cover the inter-electrode insulating film 25. The upper electrode 26 is formed at a position overlapped with the lower electrode 24 in each subpixel 12 when seen in a plan view. More specifically, in the subpixel 12, the lower electrode 24 and the upper electrode 26 are opposed to each other with interposing (via) the inter-electrode insulating film 25 therebetween.

In the subpixel 12, a contact hole 27 which penetrates through the inter-electrode insulating film 25 and the interlayer resin film (planarization film) 23 to reach the drain electrode DE of the TFT 16 is formed at a position overlapped with the drain electrode DE when seen in a plan view. At a bottom portion of the contact hole 27, the drain electrode DE is exposed. The upper electrode 26 is electrically connected to the drain electrode DE exposed at the bottom portion of the contact hole 27. Therefore, the upper electrode 26 operates as a pixel electrode.

Note that, in FIG. 1, for the sake of easy understanding, only a part of the upper electrode 26 is shown (the same is true in FIG. 4, FIG. 5, and FIG. 16 to FIG. 18 below). Also, in the illustration of FIG. 1, an edge portion of the upper electrode 26 is not overlapped with the light shielding portion 31 described later for the sake of easy understanding, but it is also possible to form the upper electrode 26 so that the edge portion of the upper electrode 26 is overlapped with the light shielding portion 31 (the same is true in FIG. 4, FIG. 5, and FIG. 16 to FIG. 18 below).

Also, an alignment film (not shown) made of, for example, polyimide is stacked (formed) so as to cover the upper electrode 26. In this alignment film, the rubbing process is performed in a positive direction in the Y axis direction of FIG. 1.

Slit-like apertures 28 extending in an extending direction of the signal line (source wiring) 14 are formed in the upper electrode 26 formed in the subpixel 12. When the X axis direction is defined as a lateral direction and the Y axis direction is defined as a longitudinal direction, the subpixel 12 has an elongated shape whose length in the lateral direction is shorter than the length in the longitudinal direction. Therefore, when the slit-like apertures 28 are formed to extend in the lateral direction, the number of both ends of the slit-like apertures 28 is increased. The end portions of the slit-like apertures 28 become abnormal alignment regions of liquid crystal molecules and cause the decrease of the aperture ratio. Therefore, in the liquid crystal display apparatus 10 of the first embodiment, as shown in FIG. 1, the extending direction of the slit-like apertures 28 is made closer to the Y axis direction rather than the X axis direction, thereby reducing the number of end portions of the slit-like apertures 28 to suppress the decrease of the aperture ratio.

The color filter substrate CF uses a second transparent substrate 30 as a base substrate thereof. The second transparent substrate 30 is made of a transparent insulating material such as glass, quartz, or plastic. In the subpixel 12, a light shielding portion (black matrix) 31 having a light shielding property and made of, for example, resin or metal is formed at a position opposed to the scanning line (gate wiring) 13 and the signal line (source wiring) 14. Also, in the subpixels 12, color filter layers 32 through which lights of different colors (for example, red (R), green (G) and blue (B)) pass are formed for each of the subpixels 12. Therefore, the light shielding portion (black matrix) 31 is provided between the subpixels 12 each having the color filter layer 32 formed therein. Note that, in FIG. 2 and FIG. 3, hatchings of the second transparent substrate 30, the color filter layer 32 and an overcoat layer 33 are omitted so as to make the drawings easy to see (the same is true in FIG. 7, FIG. 11 and FIG. 12 below).

Note that the ratio of the area occupied by the part not covered by the light shielding portion 31 in the area of the subpixel 12 (area of the region R1) corresponds to the aperture ratio.

The overcoat layer 33 made of, for example, a transparent resin material such as photoresist is stacked (formed) so as to cover the light shielding portion 31 and the color filter layer 32 of each subpixel 12. The overcoat layer 33 of each subpixel 12 is formed so as to planarize the unevennesses due to the color filter layers 32 of different colors and prevent foreign materials from the light shielding portion 31 and the color filter layer 32 from entering the liquid crystal layer LC.

On the overcoat layer 33, the photo spacer (spacer portion) 34 for maintaining a space between the array substrate AR and the color filter substrate CF and keeping the liquid crystal layer LC at a predetermined thickness is formed. The photo spacer (spacer portion) 34 is made of, for example, a transparent resin material such as photoresist. Then, an alignment film (not shown) made of, for example, polyimide is formed so as to cover the overcoat layer 33 and the photo spacer (spacer portion) 34. In this alignment film (not shown) formed in the color filter substrate CF, the rubbing process in the direction reverse to that of the alignment film (not shown) formed in the array substrate AR is performed.

The array substrate AR and the color filter substrate CF described above are disposed so as to be opposed to each other (opposed disposition) via the photo spacer (spacer portion) 34 for maintaining a space between the array substrate AR and the color filter substrate CF. Also, though not shown, a sealing member is provided between an outer periphery of the array substrate AR and an outer periphery of the color filter substrate CF. Then, between the array substrate AR and the color filter substrate CF disposed so as to be opposed to each other (opposed disposition), for example, the liquid crystal layer LC of homogeneous alignment is filled. Note that, in FIG. 2 and FIG. 3, hatching of the liquid crystal layer LC is omitted so as to make the drawings easy to see (the same is true in FIG. 7 below).

In the example shown in FIG. 1, the photo spacer (spacer portion) 34 is provided so as to correspond to all of the subpixels 12, but it is not always necessary to provide the photo spacer (spacer portion) 34 so as to correspond to all of the subpixels 12. For example, one photo spacer (spacer portion) 34 may be provided for each two subpixels 12 arranged along the extending direction (X axis direction) of the scanning line (gate wiring) 13. Also, one photo spacer (spacer portion) 34 may be provided for each three subpixels 12 arranged along the extending direction (X axis direction) of the scanning line (gate wiring) 13. Alternatively, one photo spacer (spacer portion) 34 may be provided for each two or more subpixels 12 arranged along the extending direction (Y axis direction) of the signal line (source wiring) 14.

In accordance with the above-described arrangement, in the subpixel 12, when the TFT 16 is brought into an ON-state, an electric field is generated between the lower electrode 24 and the upper electrode 26 so that the orientation of liquid crystal molecules in the liquid crystal layer LC is changed. Thus, the light transmittance of the liquid crystal layer LC is changed so that an image is displayed in the FFS mode. Moreover, areas in which the lower electrode 24 and the upper electrode 26 are opposed to each other, with (via) the inter-electrode insulating film 25 interposed therebetween, are allowed to form an auxiliary capacitance so that even when the TFT 16 is brought into an OFF-state, the electric field between the lower electrode 24 and the upper electrode 26 is maintained for a predetermined period of time.

In the present first embodiment, the slit-like aperture 28 is provided with a bend portion 28a in its middle portion, for example, in the center portion along the extending direction (Y axis direction) of the slit-like aperture 28. On a portion closer to the positive direction (+Y direction) side in the Y axis direction from the bend portion 28a, the extending direction of the slit-like aperture 28 is tilted by +α (supposing that the clockwise direction is positive and that α is positive) relative to a rubbing direction (positive direction in the Y axis direction). Moreover, on a portion closer to the negative direction (−Y direction) side in the Y axis direction from the bend portion 28a, the extending direction of the slit-like aperture 28 is tilted by −α relative to the rubbing direction (positive direction in the Y axis direction). The tilt angle α may be set to, for example, 5 degrees.

When all the slit-like apertures 28 are tilted in the clockwise direction or in the counter-clockwise direction relative to the rubbing direction (positive direction in the Y axis direction), since liquid crystal molecules are twisted in one direction, a color-varying phenomenon occurs depending on viewing directions. This phenomenon is caused because an apparent hue difference (retardation) is varied depending on directions in which the liquid crystal molecules are viewed. Therefore, in the liquid crystal display device 10 of the present first embodiment, in order to reduce the hue difference (retardation) generated depending on directions in which the liquid crystal molecules are viewed, the slit-like aperture 28 is provided with the bend portion 28a in its middle portion, for example, in the center portion along the extending direction of the slit-like aperture 28. In the example shown in FIG. 1, the slit-like aperture 28 is bent by an angle of 2α before and after the bend portion 28a along the Y axis direction.

In the present first embodiment, the extending direction of the signal line (source wiring) 14 is not tilted relative to the rubbing direction (positive direction in the Y axis direction), but made in parallel with the Y axis direction. That is, in the present first embodiment, the signal line (source wiring) 14 is not bent, but linearly formed. Even in this structure, for example, when the tilt angle α of the slit-like aperture 28 relative to the rubbing direction (positive direction in the Y axis direction) is small, the direction and size of the electric field generated between the upper electrode 26 and the lower electrode 24 can be made virtually uniform within a single subpixel.

Alternatively, within the single subpixel 12, at a portion closer to the positive direction (+Y direction) side in the Y axis direction from the center portion, the extending direction of the signal line (source wiring) 14 can be tilted by +α relative to the rubbing direction (positive direction in the Y axis direction). Moreover, at a portion closer to the negative direction (−Y direction) side in the Y axis direction from the center portion, the extending direction of the signal line (source wiring) 14 can be tilted by −α relative to the rubbing direction (positive direction in the Y axis direction). That is, in accordance with the slit-like aperture 28, a bend portion can also be formed in the center portion of the signal line (source wiring) 14 along the Y axis direction.

Figure 4:
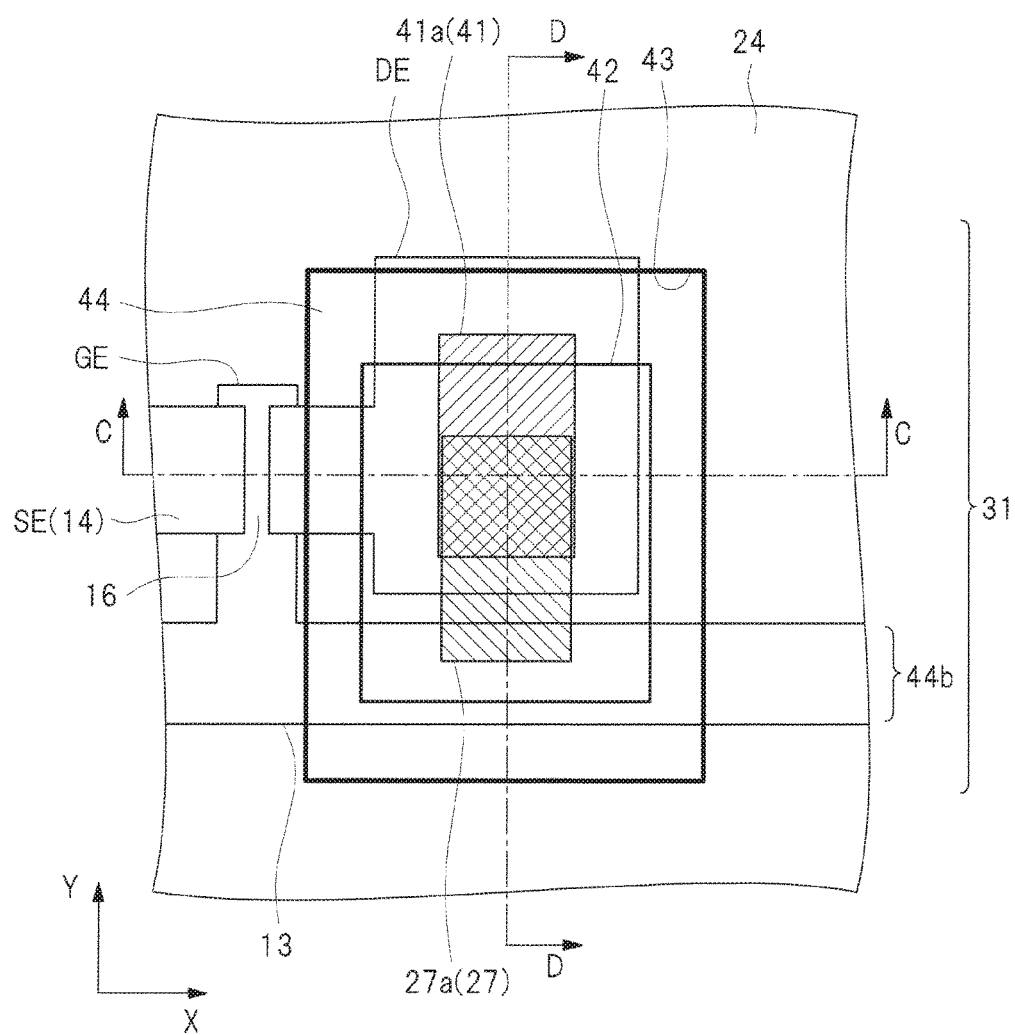
FIG. 4 is a plan view showing a part of one subpixel near a drain electrode in the liquid crystal display apparatus of the first embodiment in an enlarged manner.
Figure 5:
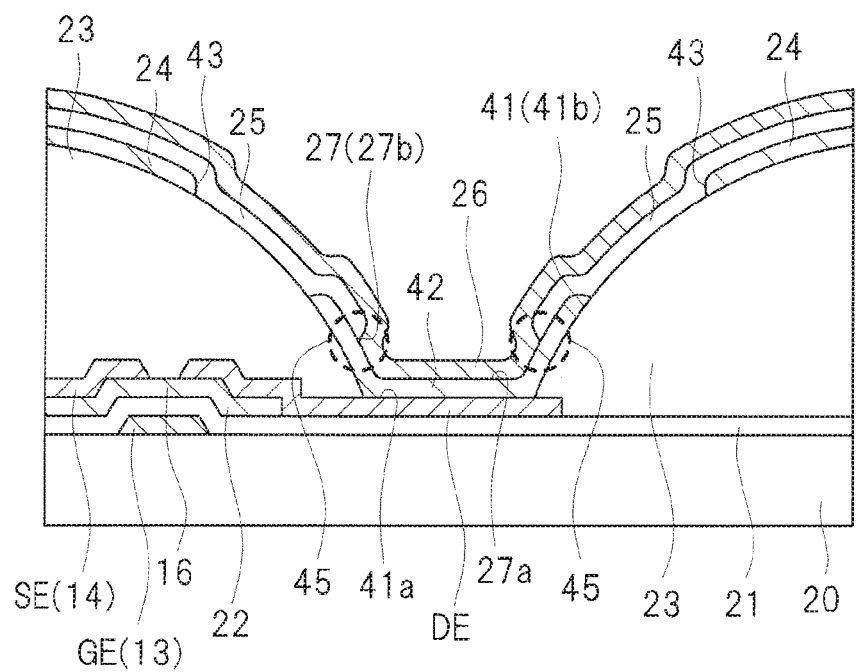
FIG. 5 is a cross-sectional view taken along the line C-C in FIG. 4.
Figure 6:
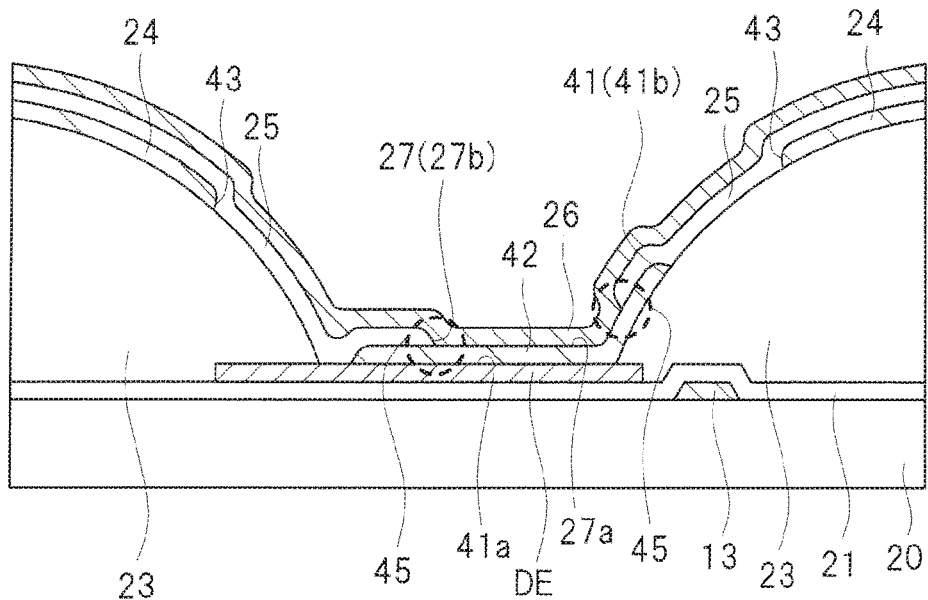
FIG. 6 is a cross-sectional view taken along the line D-D in FIG. 4.

Referring to FIGS. 4 to 6, the following description will explain the lower electrode 24, the inter-electrode insulating film 25, the upper electrode 26 and the contact hole (opening) 27 of the liquid crystal display device 10 of the present first embodiment in detail.

FIG. 4 is a plan view that shows a portion near the drain electrode of one of the subpixels in the liquid crystal display device of the first embodiment in an enlarged manner. FIG. 5 is a cross-sectional view taken along the line C-C of FIG. 4. FIG. 6 is a cross-sectional view taken along the line D-D of FIG. 4.

Additionally, to facilitate understanding, FIG. 4 illustrates a (perspective) state from which the color filter substrate CF is removed. Moreover, to facilitate understanding, FIG. 4 also illustrates a state in which, from the array substrate AR, the gate insulating film 21 (see FIG. 5), the semiconductor layer 22 (see FIG. 5), the interlayer resin film (planarization film) 23 (see FIG. 5), the inter-electrode insulating film 25 (see FIG. 5) and the upper electrode 26 (see FIG. 5) are removed (as a perspective view) so that the lower electrode 24 is seen on the uppermost surface. Moreover, to facilitate understanding, FIG. 4 also illustrates a peripheral portion of a bottom portion 27a of the contact hole (opening) 27 formed on the inter-electrode insulating film 25 (see FIG. 5).

On the interlayer resin film (planarization film) 23, when seen in its plan view, a hole (opening) 41 that penetrates the interlayer resin film (planarization film 23) to reach a drain electrode DE is formed at a position that overlaps with the drain electrode DE. Onto a bottom portion 41a of the hole (opening) 41, the drain electrode DE is exposed. On the drain electrode DE exposed to the bottom portion 41a of the hole (opening) 41, an island-shaped electrode 42 is formed. Moreover, when seen in its plan view, on a region apart from the bottom portion 41a of the hole (opening) 41, the lower electrode 24 is formed on the interlayer resin film (planarization film) 23. Additionally, the island-shaped electrode 42 is formed not only on the drain electrode DE exposed to the bottom portion 41a of the hole (opening) 41, but also on a side surface portion 41b of the hole (opening) 41.

As described above, the lower electrode 24 is continuously formed integrally on virtually the entire transparent region including the region of each of the subpixels 12. However, as shown in FIG. 4, on the lower electrode 24, an opening 43 is formed so that, when seen in its plan view, the island-shaped electrode 42 and the lower surface portion 41a of the hole (opening) 41 are disposed inside the opening 43. The lower surface of the island-shaped electrode 42 is made in contact with the upper surface of the drain electrode DE, with the upper surface of the island-shaped electrode 42 being made in contact with the lower surface of an upper electrode 26, which will be described later; however, the island-shaped electrode 42 is made in contact neither with any of the electrodes, nor with any of the wiring, except for the drain electrode DE and the upper electrode 26. In other words, although the island-shaped electrode 42 is surrounded by the lower electrode 24, when seen in its plan view, it is separated from the lower electrode 24 so that it has the island shape when seen in its plan view.

On the island-shaped electrode 42, on the lower electrode 24, as well as on the interlayer resin film (planarization film) 23 exposed to a region 44 between the island-shaped electrode 42 and the lower electrode 24, when seen in its plan view, the inter-electrode insulating film 25 is formed. On the inter-electrode insulating film 25, when seen in its plan view, a contact hole (opening) 27 that penetrates the inter-electrode insulating film 25 to reach the island-shaped electrode 42 is formed at a position that overlaps with the island-shaped electrode 42. On the bottom portion 27a of the contact hole (opening) 27, the island-shaped electrode 42 is exposed. On the island-shaped electrode 42 exposed to the bottom portion 27a of the contact hole (opening) 27 as well as on the inter-electrode insulating film 25 on the periphery of the island-shaped electrode 42, when seen in its plan view, the upper electrode 26 is formed.

As described above, the lower surface of the island-shaped electrode 42 is made in contact with the upper surface of the drain electrode DE, and the upper surface of the island-shaped electrode 42 is made in contact with the lower surface of the upper electrode 26. Therefore, the upper electrode 26 and the drain electrode DE are electrically connected with each other through the island-shaped electrode 42.

As shown in FIGS. 5 and 6, on an edge portion 45 of the bottom portion 27a of the contact hole (opening) 27, the island-shaped electrode 42 is sandwiched between the inter-electrode insulating film 25 and the interlayer resin film (planarization film) 23 so that the inter-electrode insulating film 25 and the interlayer resin film (planarization film) 23 are not directly made in contact with each other. By using such a structure, upon forming the contact hole (opening) 27, it is possible to prevent or suppress the interlayer resin film (planarization film) 23 from being scraped off (hollowed) together with the inter-electrode insulating film 25. As a result, it is possible to prevent or suppress the width dimension of the contact hole (opening) 27 from becoming larger toward the lower side to cause a reverse-tapered shape in the cross-sectional shape of the contact hole (opening) 27. Thus, upon forming the upper electrode 26 on the contact hole (opening) 27, it is possible to prevent or suppress an occurrence of a so-called "step disconnection or step fault" in which the upper electrode 26, formed on the side surface portion 27b of the contact hole (opening) 27, and the upper electrode 26, formed on the bottom portion 27a of the contact hole (opening) 27, are not connected with each other.

Moreover, as will be described later with reference to FIGS. 11 to 14, the island-shaped electrode 42 is formed through processes in which a conductive film 46 (see FIG. 11 to be described later) to be formed into the lower electrode 24 is formed on the entire surface of the array substrate AR and the same conductive film 46 thus formed is subjected to a patterning process. With this structure, the island-shaped electrode 42 can be formed simultaneously with the lower electrode 24 in the process for forming the lower electrode 24, without the need for adding any new process. Moreover, since the island-shaped electrode 42 and the lower electrode 24 are formed by the same conductive film 46, the island-shaped electrode 42 and the lower electrode 24 are desirably formed by using the same material.

In the liquid crystal display device 10 of the present first embodiment, preferably, the contact hole (openings) 27 is formed at a position deviating from the hole (opening) 41 in a direction intersecting with the scanning line (gate wiring) 13, for example, along the extending direction (Y axis direction of FIG. 4) of the signal line (source wiring) 14. With this structure, it is possible to increase the amount of allowance by which, when seen in its plan view, the position at which the opening 43 is formed on the lower electrode 24 is allowed to deviate along the Y axis direction from a position at which a light-shielding unit 31 is formed. For this reason, it becomes possible to prevent or suppress a reduction of an aperture ratio (aperture ratio loss) in the subpixels 12.

More preferably, when seen in its plan view, the opening 43 of the lower electrode 24 is formed in such a manner as to traverse the scanning line (gate wiring) 13. By forming the opening 43 so as to traverse the scanning line (gate wiring) 13, it is possible to reduce an area in which the lower electrode 24 and the scanning line (gate wiring) 13 are overlapped with each other. For this reason, a parasitic capacitance between the lower electrode 24 and the scanning line (gate wiring) 13 can be reduced.

Additionally, in the present specification, the point that the contact hole (opening) 27 is formed at a position deviating from the hole (opening) 41 along the Y axis direction means that, when seen in its plan view, the position of the center of gravity of the bottom portion 27a of the contact hole (opening) 27 and the position of the center of gravity of the bottom face 41a of the hole (opening) 41 are located at different positions along the Y axis direction. That is, the position of the center of gravity of the bottom portion 27a of the contact hole (opening) 27 and the position of the center of gravity of the bottom face 41a of the hole (opening) 41 are separated from each other along the Y axis direction.

<Manufacturing Process of Liquid Crystal Display Device>

Next, referring to FIGS. 7 to 20, the following description will explain manufacturing processes of a liquid crystal display device 10 of the present first embodiment. FIGS. 7 to 20 are cross-sectional views showing the principal part during manufacturing processes of the liquid crystal display device in accordance with first embodiment. FIGS. 7, 9, 11, 13, 15 and 17 indicate cross sections corresponding to the cross sections shown in the aforementioned FIG. 5. Moreover, FIGS. 8, 10, 12, 14, 16 and 18 indicate cross sections corresponding to the cross sections shown in the aforementioned FIG. 6.

Figure 7:
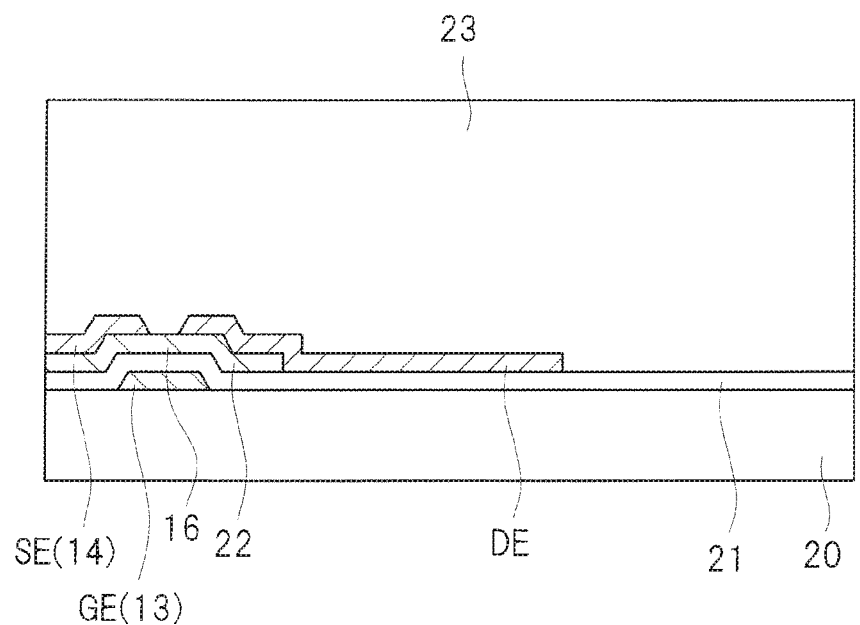
FIG. 7 is a cross-sectional view showing the principal part in the manufacturing process of the liquid crystal display apparatus of the first embodiment.
Figure 8:
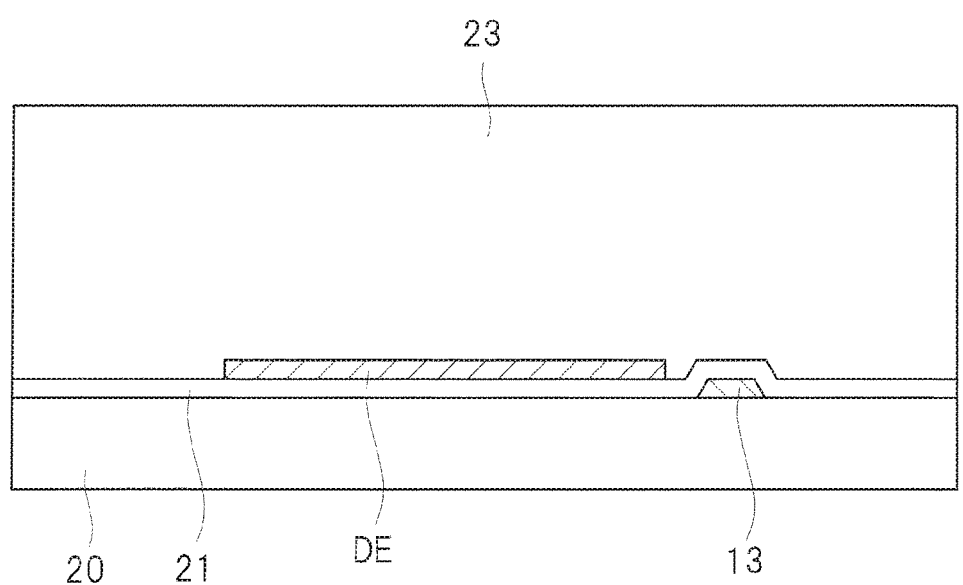
FIG. 8 is a cross-sectional view showing the principal part in the manufacturing process of the liquid crystal display apparatus of the first embodiment.

First, as shown in FIGS. 7 and 8, on a surface (first main surface) of a first transparent substrate 20, by using a photolithography technique and etching, a gate electrode GE composed of an Al (aluminum) layer and an Mo (molybdenum) layer and a scanning line (gate wiring) 13 are formed, for example, in the order from the lower layer to the upper layer.

Next, as shown in FIGS. 7 and 8, on the gate electrode GE as well as on the first transparent substrate 20, a gate insulating film 21 made of, for example, silicon nitride or the like, is formed by using a CVD (Chemical Vapor Deposition) method. Moreover, by using the photolithography technique and etching, a semiconductor layer 22 having a two-layer structure of, for example, an a-Si (amorphous silicon) layer and an n$^+$-Si (n$^+$-type silicon) layer having an n-type conductivity is formed so as to be overlapped with the gate electrode GE via the gate insulating film 21, when seen in its plan view.

Next, as shown in FIGS. 7 and 8, on the semiconductor layer 22, a source electrode SE, composed of an Mo layer, an Al layer and an Mo layer in the order from the lower layer to the upper layer, a signal line (source wiring) 14 and a drain electrode DE are formed so as to be overlapped with the gate electrode GE and the semiconductor layer 22 and also to be electrically connected with the semiconductor layer 22, when seen in its plan view. Thus, a TFT (thin-film transistor) 16 is formed.

Next, as shown in FIGS. 7 and 8, on the signal line (source wiring) 14, the source electrode SE, the semiconductor layer 22 and the drain electrode DE, as well as on the gate insulating film 21, the interlayer resin film (planarization film) 23 is formed. That is, the interlayer resin film (planarization film) 23 is formed in a manner so as to cover the exposed portions of the signal line (source wiring) 14, the source electrode SE and the semiconductor layer 22, as well as the exposed portions of the drain electrode DE and the gate insulating film 21. The interlayer resin film (planarization film) 23 is formed as a protective film made of an acryl-based photosensitive resin, by using, for example, an application method.

Additionally, a transparent passivation film made of, for example, silicon nitride, silicon oxide, or the like may be stacked (formed) in a manner so as to cover one portion or the entire portion of the exposed portions of the signal line (source wiring) 14, the source electrode SE and the semiconductor layer 22, as well as the exposed portions of the drain electrode DE and the gate insulating film 21. Then, the interlayer resin film (planarization film) 23 may be stacked (formed) so as to cover the passivation film.

Figure 9:
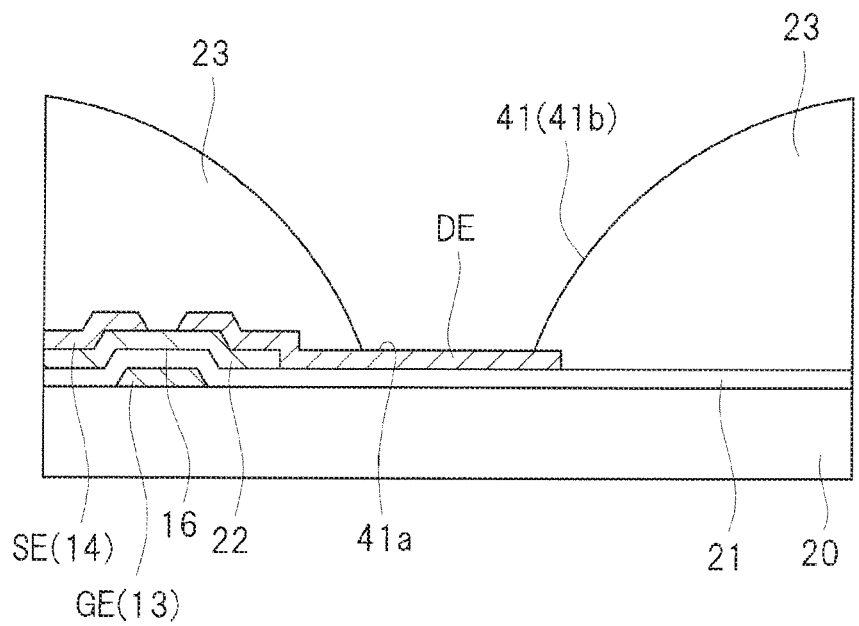
FIG. 9 is a cross-sectional view showing the principal part in the manufacturing process of the liquid crystal display apparatus of the first embodiment.
Figure 10:
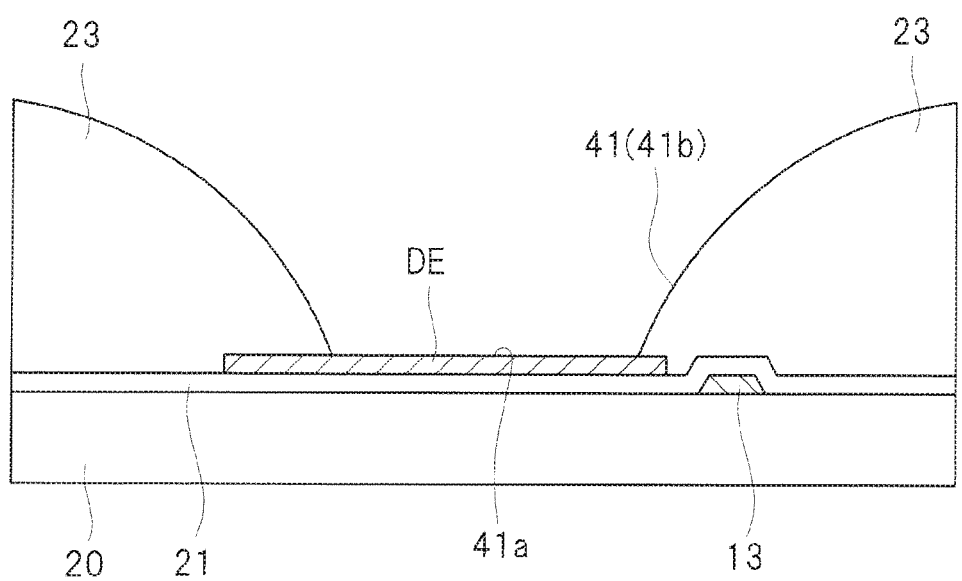
FIG. 10 is a cross-sectional view showing the principal part in the manufacturing process of the liquid crystal display apparatus of the first embodiment.

Next, a portion of the interlayer resin film (planarization film) 23, which is formed on the drain electrode DE, is removed by using a photolithography technique and etching. Thus, as shown in FIGS. 4, 9 and 10, a hole (opening) 41, which penetrates the interlayer resin film (planarization film) 23 to reach the drain electrode DE, is formed at a position that is overlapped with the drain electrode DE, when seen in its plan view. In this case, the drain electrode DE is exposed to the bottom portion 41a of the hole (opening) 41.

Figure 11:
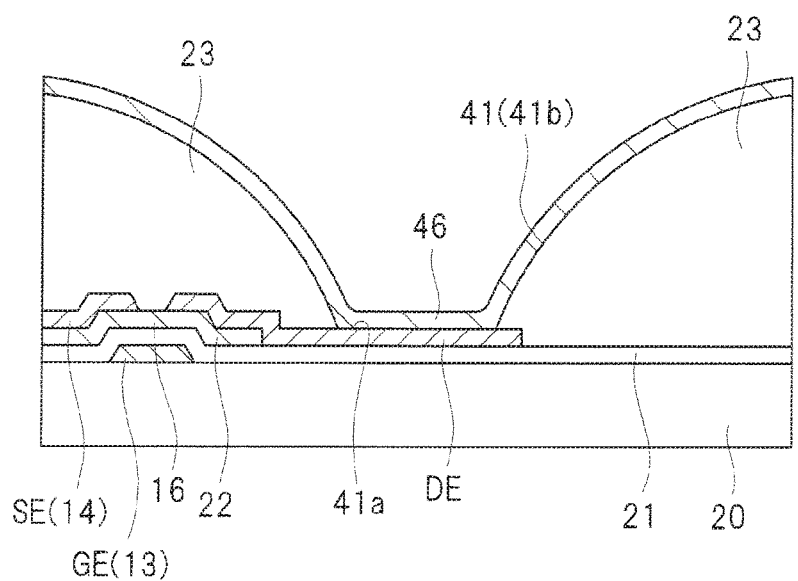
FIG. 11 is a cross-sectional view showing the principal part in the manufacturing process of the liquid crystal display apparatus of the first embodiment.
Figure 12:
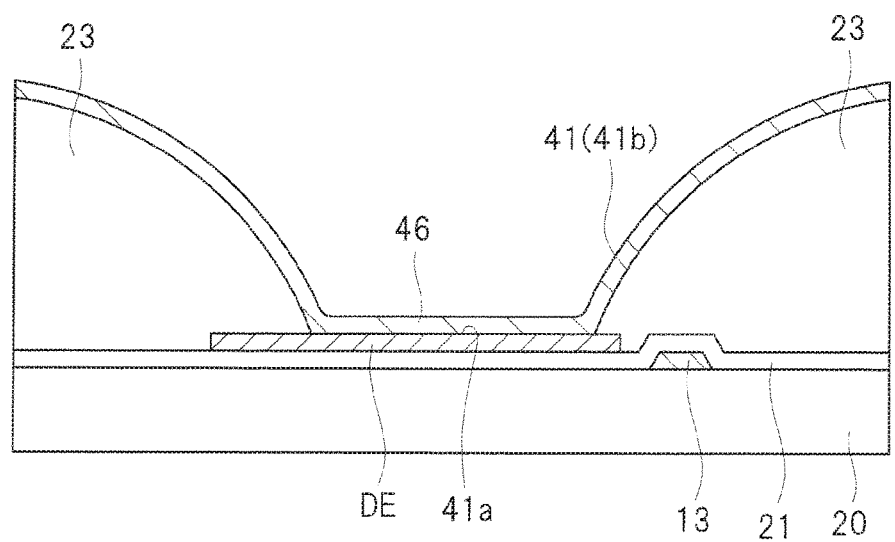
FIG. 12 is a cross-sectional view showing the principal part in the manufacturing process of the liquid crystal display apparatus of the first embodiment.

As shown in FIGS. 11 and 12, on the drain electrode DE exposed to the bottom portion 41a of the hole (opening) 41 as well as on the interlayer resin film (planarization film) 23, a conductive film 46 made of ITO (Indium-Tin-Oxide), IZO (Indium-Zinc-Oxide) or the like is formed by using, for example, a sputtering method. In other words, the conductive film 46 is formed in a manner so as to cover the drain electrode DE exposed to the bottom portion 41a of the hole (opening) 41 and the interlayer resin film (planarization film) 23.

Figure 13:
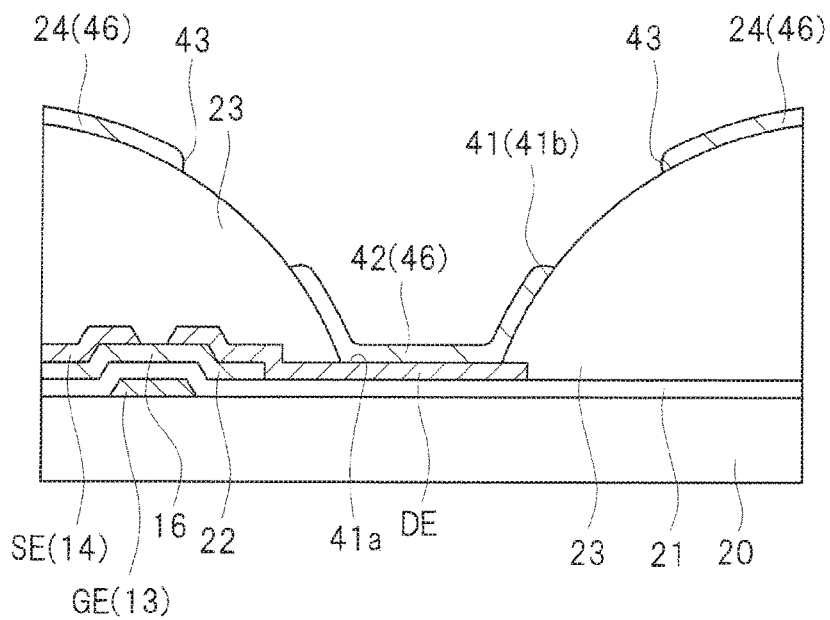
FIG. 13 is a cross-sectional view showing the principal part in the manufacturing process of the liquid crystal display apparatus of the first embodiment.
Figure 14:
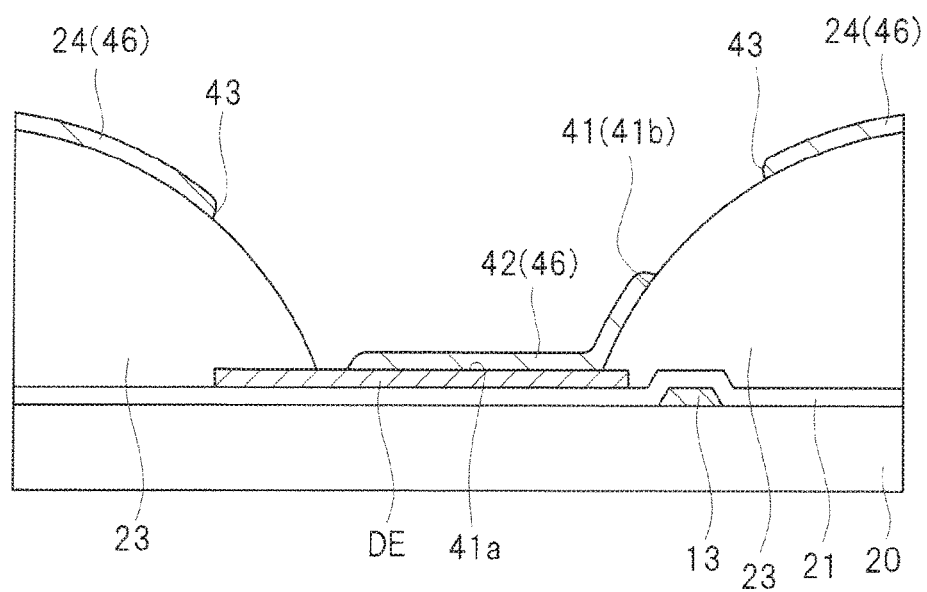
FIG. 14 is a cross-sectional view showing the principal part in the manufacturing process of the liquid crystal display apparatus of the first embodiment.

Next, a portion (see FIG. 4) inside a frame-shaped region 44 is removed by using a photolithography technique and etching so that, when seen in its plan view, an island-shaped electrode 42 is allowed to remain at a region overlapped with at least one portion of the drain electrode DE and the hole (opening) 41 within the conductive film 46 thus formed. That is, the portion inside the frame-shaped region 44 (see FIG. 4) of the conductive film 46 is bored. In this manner, by carrying out a patterning process on the conductive film 46, the lower electrode 24 made of the conductive film 46 is formed as shown in FIGS. 4, 13 and 14. Moreover, the opening 43 is formed on the lower electrode 24 simultaneously as the formation of the lower electrode 24, and the island-shaped electrode 42 made of the conductive film 46 is formed within the opening 43. At this time, the bottom portion 41a of the hole (opening) 41 is disposed inside the opening 43 when seen in its plan view. Thus, it becomes possible to prevent the lower electrode 24 (see FIG. 5) and the upper electrode 26 (see FIG. 5) from causing short circuits electrically.

As shown in FIGS. 13 and 14, in the present first embodiment, the island-shaped electrode 42 is formed on the bottom portion 41a of the hole (opening) 41 as well as on a side surface portion 41b of the hole (opening) 41.

Figure 15:
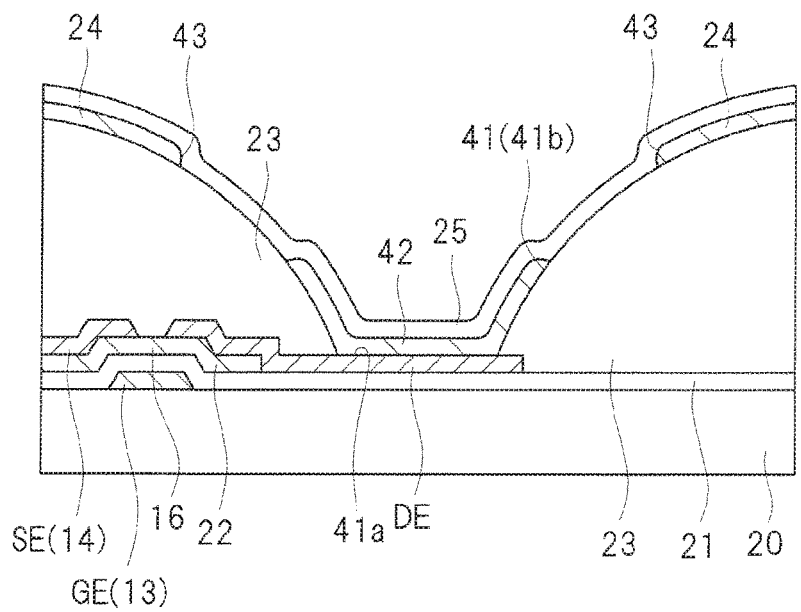
FIG. 15 is a cross-sectional view showing the principal part in the manufacturing process of the liquid crystal display apparatus of the first embodiment.
Figure 16:
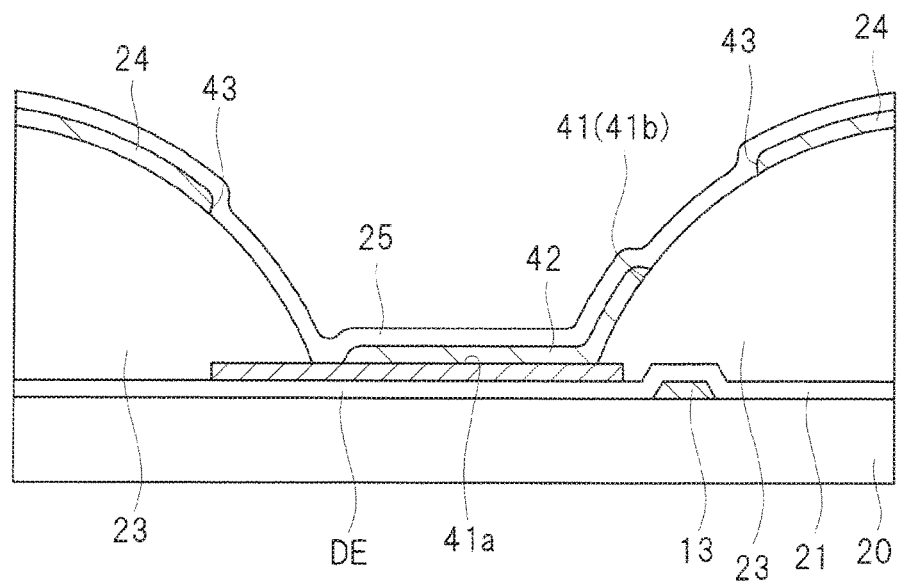
FIG. 16 is a cross-sectional view showing the principal part in the manufacturing process of the liquid crystal display apparatus of the first embodiment.

Next, as shown in FIGS. 15 and 16, on the island-shaped electrode 42, on the lower electrode 24 as well as on the interlayer resin film (planarization film) 23 that is exposed to a region (frame-shaped region) 44 between the island-shaped electrode 42 and the lower electrode 24, when seen in its plan view, an inter-electrode insulating layer 25 made of silicon nitride or the like is formed by using, for example, the CVD method. That is, the inter-electrode insulating layer 25 is formed in a manner so as to cover the island-shaped electrode 42, the lower electrode 24 and the interlayer resin film (planarization film) 23 that is exposed to the region (frame-shaped region) 44 (see FIG. 4) between the island-shaped electrode 42 and the lower electrode 24, when seen in its plan view.

Figure 17:
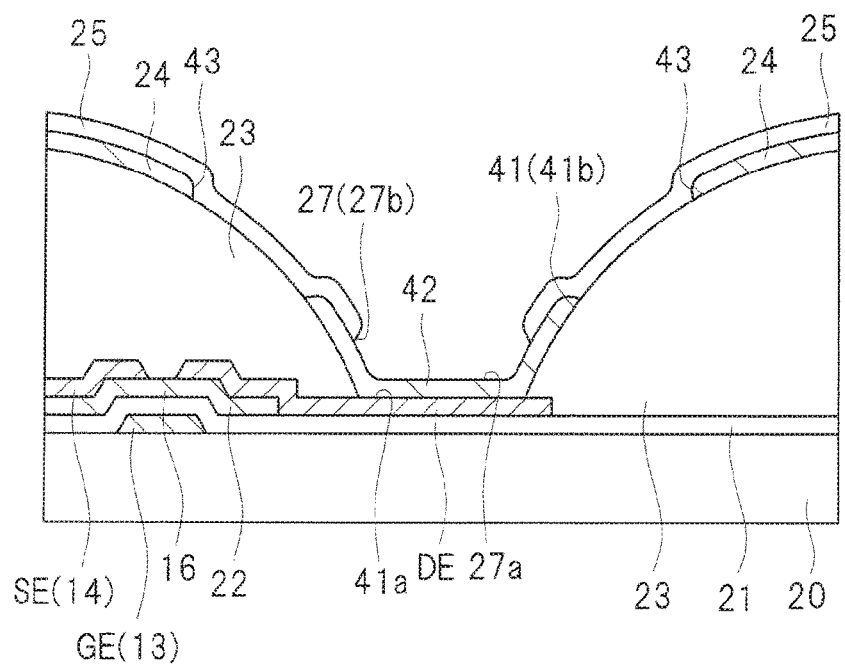
FIG. 17 is a cross-sectional view showing the principal part in the manufacturing process of the liquid crystal display apparatus of the first embodiment.
Figure 18:
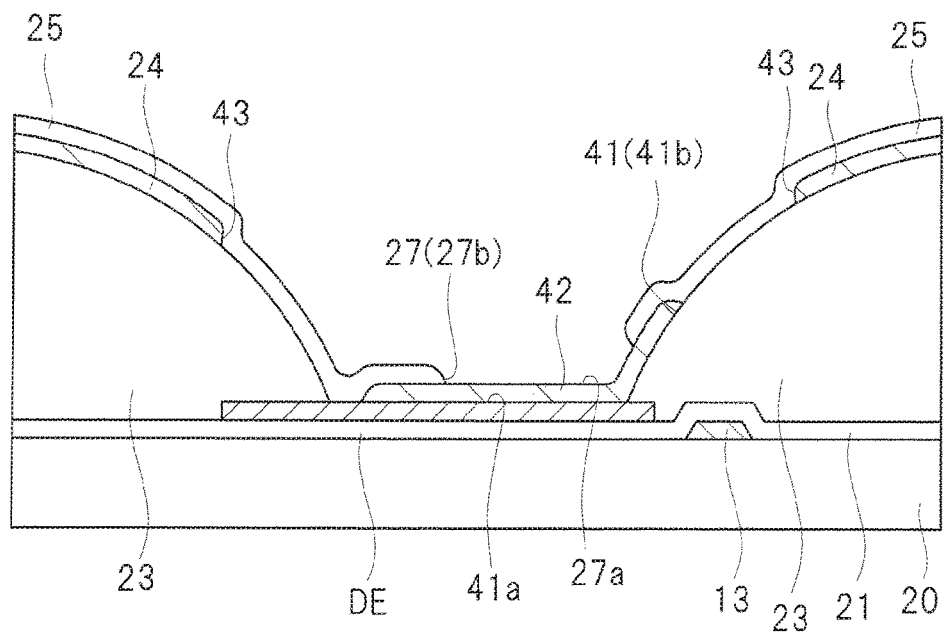
FIG. 18 is a cross-sectional view showing the principal part in the manufacturing process of the liquid crystal display apparatus of the first embodiment.

Next, a portion of the inter-electrode insulating film 25 on which the contact hole (opening) 27 has been formed is removed by using a photolithography technique and etching. Thus, as shown in FIGS. 4, 17 and 18, a contact hole (opening) 27, which penetrates the inter-electrode insulating film 25 to reach the island-shaped electrode 42, when seen in its plan view, is formed. Moreover, the island-shaped electrode 42 is exposed to the bottom portion 27a of the contact hole (opening) 27.

As shown in FIG. 18, in the present first embodiment, the contact hole (opening) 27 is formed at a position deviating from the hole (opening) 41 along a direction (the Y axis direction of FIG. 4) intersecting with the extending direction of the scanning line (gate wiring) 13. With this arrangement, it is possible to increase the amount of allowance by which, when seen in its plan view, the position at which the opening 43 is formed on the lower electrode 24 is allowed to deviate along the Y axis direction from a position at which the light-shielding unit 31 is formed.

Next, the upper electrode 26 made of ITO, IZO or the like is formed on the island-shaped electrode 42 as well as on the inter-electrode insulating film 25 by using, for example, a sputtering method. That is, the upper electrode 26 is formed in a manner so as to cover the island-shaped electrode 42 and the inter-electrode insulating film 25. Thus, as shown in FIGS. 5 and 6, the upper electrode 26 and the drain electrode DE are electrically connected with each other via the contact hole (opening) 27. Moreover, the upper electrode 26 and the drain electrode DE are electrically connected with each other via the island-shaped electrode 42.

Then, though not shown in FIGS. 5 and 6, the slit-like aperture 28 (see FIG. 1) is formed on the formed upper electrode 26 by the photolithography and etching. Thereafter, though not shown in FIGS. 5 and 6, the alignment film made of polyimide or the like is formed on the upper electrode 26 by, for example, the coating method. In this manner, the array substrate AR of the liquid crystal display apparatus 10 is formed.

Figure 19:
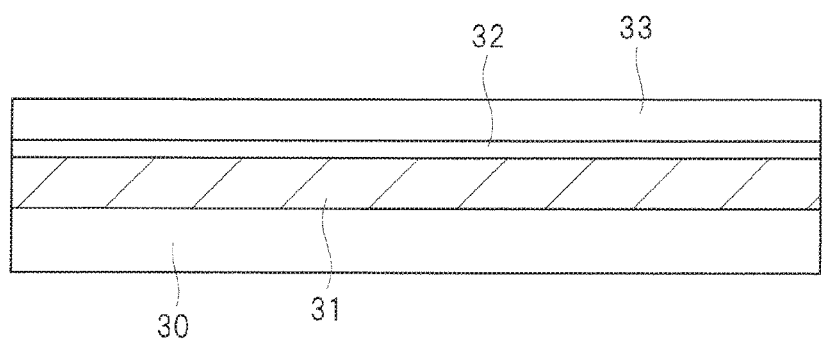
FIG. 19 is a cross-sectional view showing the principal part in the manufacturing process of the liquid crystal display apparatus of the first embodiment.

On the other hand, as shown in FIG. 19, a film made of, for example, a black resin material is formed on the front surface (first main surface) of the second transparent substrate 30, and is then etched, thereby forming the light shielding portion (black matrix) 31. Next, as shown in FIG. 11, the color filter layer 32 is formed for each subpixel 12 by the photolithography. Specifically, the color filter layer 32 of red (R), green (G) or B (blue) is formed for each subpixel 12 (see FIG. 1).

Next, as shown in FIG. 19, the overcoat layer 33 made of acrylic photosensitive resin is formed by, for example, the coating method on the light shielding portion (black matrix) 31 and the color filter layer 32. The overcoat layer 33 is formed so as to cover the light shielding portion (black matrix) 31 and the color filter layer 32.

Figure 20:
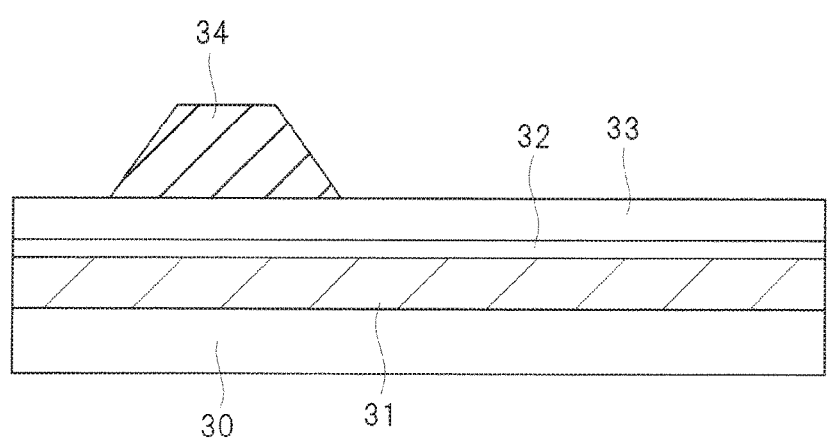
FIG. 20 is a cross-sectional view showing the principal part in the manufacturing process of the liquid crystal display apparatus of the first embodiment.

Next, as shown in FIG. 20, the photo spacer (spacer portion) 34 made of, for example, acrylic photosensitive resin is formed by the photolithography on the overcoat layer 33. Thereafter, though not shown in FIG. 12, the alignment film made of polyimide is formed on the surface of the overcoat layer 33 and the surface of the photo spacer (spacer portion) 34. In this manner, the color filter substrate CF of the liquid crystal display apparatus 10 is formed.

The array substrate AR and the color filter substrate CF formed in the above-described manner are disposed so that the front surfaces (first main surfaces), not the rear surfaces (second main surface) thereof, are opposed (opposed disposition). Then, by providing the sealing member (not shown) to the circumference of the array substrate AR and the color filter substrate CF disposed to be opposed, the array substrate AR and the color filter substrate CF are adhered to each other. Thereafter, by filling the liquid crystal of homogeneous alignment as the liquid crystal layer LC between the array substrate AR and the color filter substrate CF, the liquid crystal display apparatus 10 of the first embodiment can be obtained.

<Concerning Aperture Ratio and Parasitic Capacitance>

Figure 21:
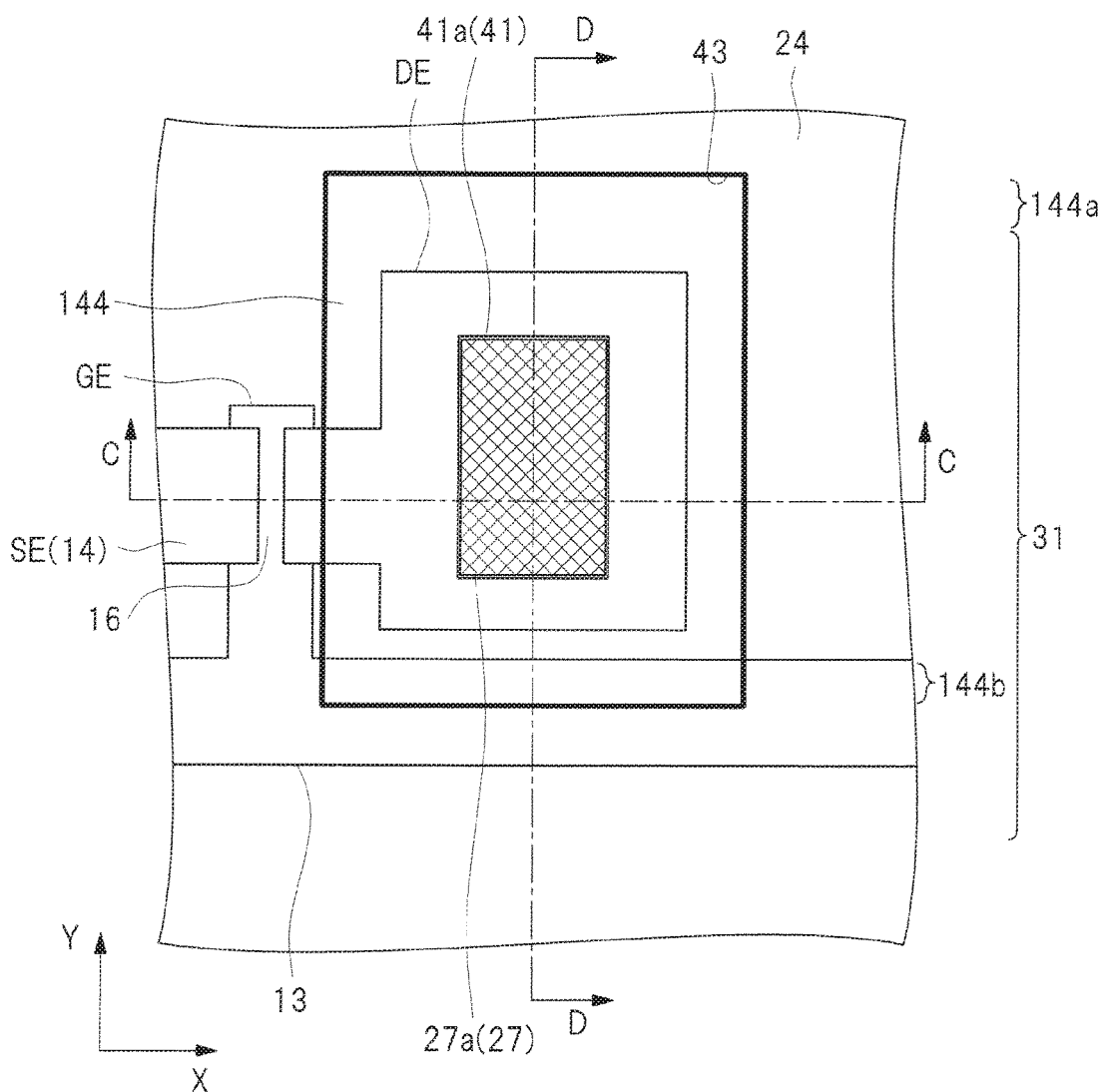
FIG. 21 is a plan view showing a part of one subpixel near a drain electrode in the liquid crystal display apparatus of a comparative example in an enlarged manner.
Figure 22:
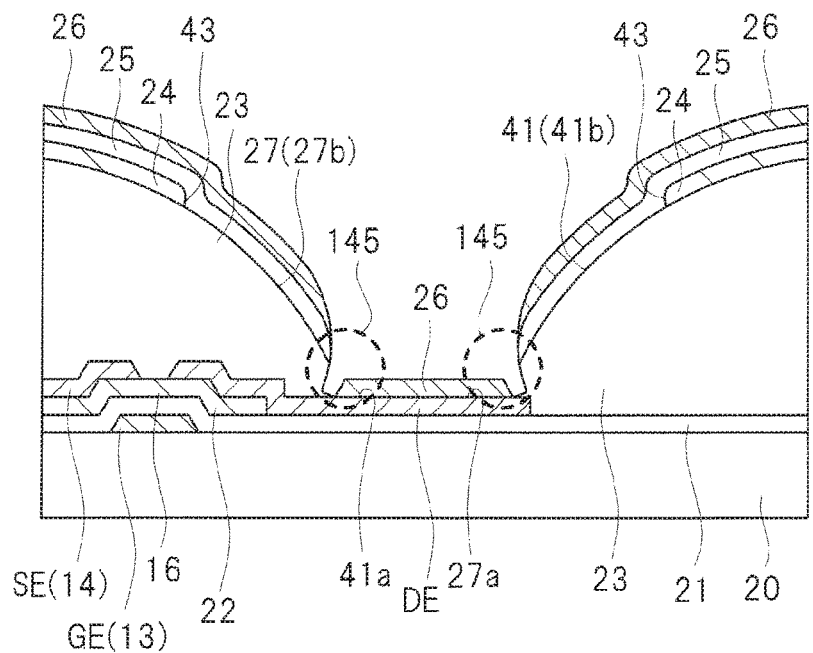
FIG. 22 is a cross-sectional view taken along the line C-C in FIG. 21.
Figure 23:
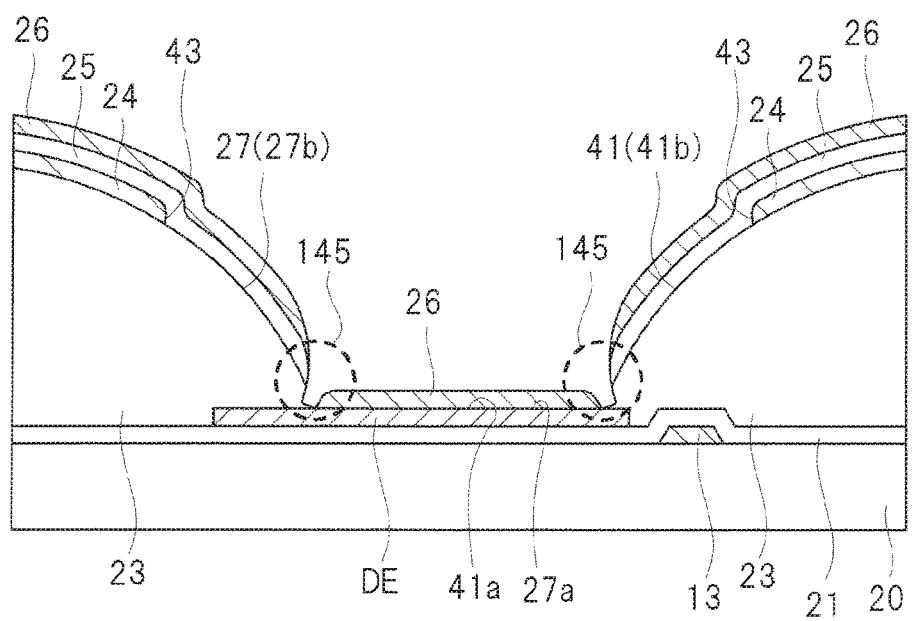
FIG. 23 is a cross-sectional view taken along the line D-D in FIG. 21.

FIG. 21 is a plan view that shows a portion near the drain electrode of one of the subpixels in a liquid crystal display device in accordance with a comparative example in an enlarged manner. FIG. 22 is a cross-sectional view taken along the line C-C of FIG. 21. FIG. 23 is a cross-sectional view taken along the line D-D of FIG. 21.

Figure 24:
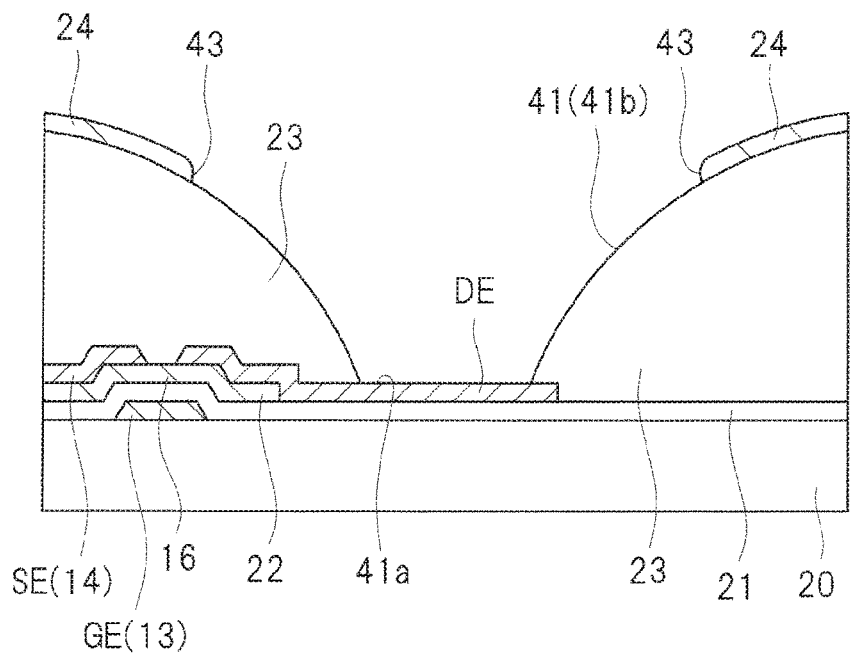
FIG. 24 is a cross-sectional view showing the principal part in the manufacturing process of the liquid crystal display apparatus of the comparative embodiment.
Figure 25:
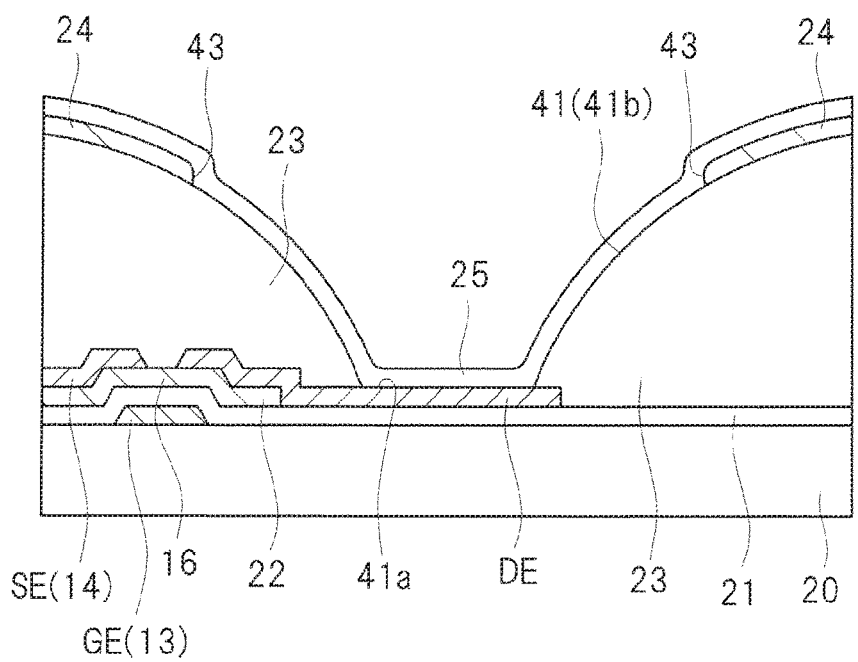
FIG. 25 is a cross-sectional view showing the principal part in the manufacturing process of the liquid crystal display apparatus of the comparative embodiment.
Figure 26:
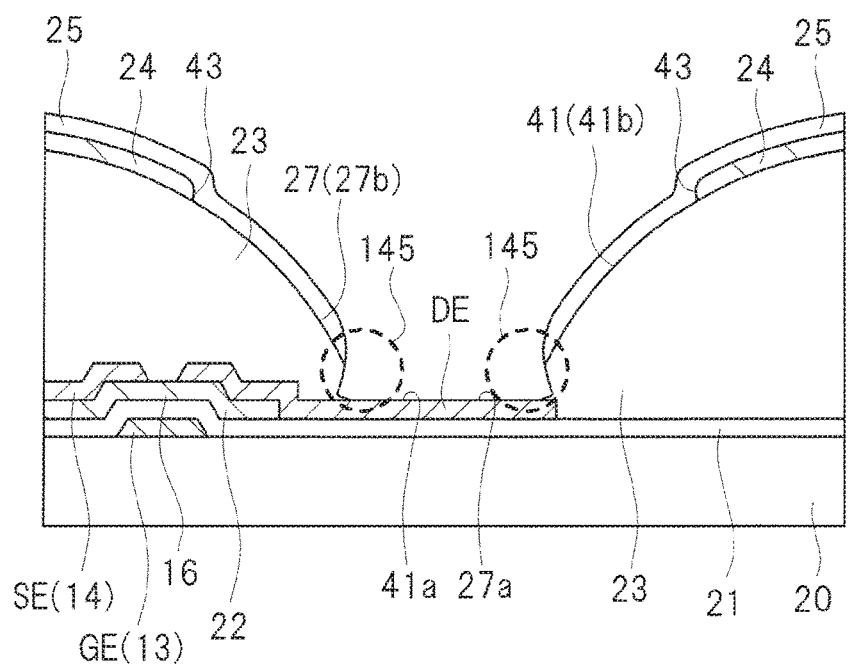
FIG. 26 is a cross-sectional view showing the principal part in the manufacturing process of the liquid crystal display apparatus of the comparative embodiment.

FIGS. 24 to 26 are cross-sectional views showing the principal part during manufacturing processes of the liquid crystal display device in accordance with the comparative example. FIGS. 24 to 26 indicate cross sections corresponding to the cross sections shown in the aforementioned FIG. 22.

Of the liquid crystal display device 110 of the comparative example, those portions except for the portions near the drain electrode are the same as those portions except for the portions near the drain electrode of the liquid crystal display device 10 of the first embodiment; therefore, the descriptions thereof will be omitted.

Moreover, in order to help to increase understanding, FIG. 21 illustrates a (perspective) state from which the color filter substrate CF is removed. Moreover, to facilitate understanding, FIG. 21 also illustrates a state in which, from the array substrate AR, the gate insulating film 21 (see FIG. 22), the semiconductor layer 22 (see FIG. 22), the interlayer resin film (planarization film) 23 (see FIG. 22), the inter-electrode insulating film 25 (see FIG. 22) and the upper electrode 26 (see FIG. 22) are removed (as a perspective view) so that the lower electrode 24 is seen on the uppermost surface. Moreover, to facilitate understanding, FIG. 21 also illustrates a peripheral portion of a bottom portion 27a of the contact hole (opening) 27 formed on the inter-electrode insulating film 25 (see FIG. 22).

As shown in FIGS. 21 to 23, in the liquid crystal display device 110 of the comparative example also, on the interlayer resin film (planarization film) 23, a hole (opening) 41 that penetrates the interlayer resin film (planarization film) 23 to reach the drain electrode DE is formed at a position that is overlapped with the drain electrode DE, when seen in its plan view. The drain electrode DE is exposed to the bottom portion 41a of the hole (opening) 41.

On the other hand, on the drain electrode DE exposed to the bottom portion 41a of the hole (opening) 41, no island-shaped electrode 42 (see FIG. 4) is formed. Moreover, when seen in its plan view, the lower electrode 24 is formed on the interlayer resin film (planarization film) 23 at a region separated from the bottom portion 41a of the hole (opening) 41.

On the drain electrode DE exposed to the bottom portion 41a of the hole (opening) 41, on the lower electrode 24, as well as on the interlayer resin film (planarization film) 23 exposed to a region between the drain electrode DE and the lower electrode 24, when seen in its plan view, the inter-electrode insulating film 25 is formed. On the inter-electrode insulating film 25, when seen in its plan view, a contact hole (opening) 27 that penetrates the interlayer resin film (planarization film) 23 to reach the drain electrode DE is formed at a position that overlaps with the drain electrode DE. On the bottom portion 27a of the contact hole (opening) 27, the drain electrode DE is exposed. On the drain electrode DE exposed to the bottom portion 27a of the contact hole (opening) 27 as well as on the inter-electrode insulating film 25, the upper electrode 26 is formed. Therefore, the upper electrode 26 is formed so as to be directly made in contact with the drain electrode DE.

In the manufacturing processes of the liquid crystal display device 110 of the comparative example, by carrying out the processes shown in FIGS. 7 to 12 in the same manner as in the manufacturing processes of the liquid crystal display device 10 of the first embodiment, the conductive film 46 is formed on the drain electrode DE exposed to the bottom portion 41a of the hole (opening) 41 as well as on the interlayer resin film (planarization film) 23.

Thereafter, in the manufacturing processes of the liquid crystal display device 110 of the comparative example, as shown in FIGS. 21 and 24, a portion within a region 144 (see FIG. 21) including the drain electrode DE and the bottom portion 41a of the hole (aperture) 41, when seen in its plan view, of the conductive film 46 thus formed is removed by using a photolithography technique and etching. That is, the conductive film 46, the portion inside the region 144 (see FIG. 21) is bored. At this time, on the region 144 inside the opening 43 formed on the lower electrode 24, no island-shaped electrode 42 (see FIG. 4) is formed.

Next, as shown in FIG. 25, the inter-electrode insulating film 25 is formed in a manner so as to cover the lower electrode 24, the drain electrode DE exposed to the bottom portion 41a of the hole (opening) 41 and the interlayer resin film (planarization film) 23 exposed to the region 144 (see FIG. 21), when seen in its plan view.

Next, of the inter-electrode insulating film 25 thus formed, a portion in which the contact hole (opening) 27 is to be formed is removed by using a photolithography technique and etching so that a contact hole (opening) 27 that penetrates the inter-electrode insulating film 25 to reach the drain electrode DE is formed. Moreover, the drain electrode DE is exposed to the bottom portion 27a of the contact hole (opening) 27.

However, as shown in FIG. 26, upon etching the inter-electrode insulating film 25, on an edge portion 145 of the bottom portion 27a of the contact hole (opening) 27, the interlayer resin film (planarization film) 23 is scraped off (hollowed) together with the inter-electrode insulating film 25. As a result, the width dimension of the contact hole (opening) 27 becomes larger toward the lower side to easily cause a reverse-tapered shape in the cross-sectional shape of the contact hole (opening) 27.

In the case when the contact hole (opening) 27 has such a reverse-tapered shape in its cross-sectional shape, upon forming the upper electrode 26 on the contact hole (opening) 27, the upper electrode 26 is hardly deposited on the edge portion 145 of the bottom portion 27a of the contact hole (opening) 27. As a result, as shown in FIGS. 22 and 23, the upper electrode 26 formed on the side surface portion 27b of the contact hole (opening) 27 and the upper electrode 26 formed on the bottom portion 27a of the contact hole (opening) 27 are not connected with each other as an integral unit, with the result that a so-called "step disconnection or step fault" is caused.

Moreover, as shown in FIG. 21, in the liquid crystal display device 110 of the comparative example, the contact hole (opening) 27 is formed on the same position as that of the hole (openings) 41 in a direction intersecting with the scanning line (gate wiring) 13, for example, along the extending direction (Y axis direction of FIG. 21) of the signal line (source wiring) 14.

The region 144 surrounded by the opening 43 formed on the lower electrode 24 is given an opening area required for preventing short circuiting from occurring between the lower electrode 24 and the upper electrode 26; therefore, the position of the opening 43 is limited by the position of the drain electrode DE. Moreover, because of the limiting conditions of the pixel layout required for achieving both of the miniaturization of the subpixel 12 and the improvement of the aperture ratio, the position of the light-shielding unit 31 is limited by the position of the drain electrode DE. Therefore, since both of the position of the opening 43 and the position of the light-shielding unit 31 are limited by the position of the drain electrode DE, the amount of allowance by which the position for use in forming the opening 43 is allowed to deviate in the Y axis direction from the position for use in forming the light-shielding unit 31 is limited to an extremely small range.

In a layout as shown in FIG. 21, one portion 144a of the region 144 surrounded by the opening 43 formed on the lower electrode 24 protrudes in the positive direction of the Y axis direction relative to the light-shielding unit 31, when seen in its plan view. In this region 144a, since no lower electrode 24 exists, it is not possible to display an image, with the directions of liquid crystal molecules being changed. For this reason, the aperture ratio of the subpixel 12 is substantially reduced. That is, an opening loss occurs.

Moreover, the position of the scanning line (gate wiring) 13 is also limited by the position of the drain electrode DE. Therefore, since both of the position of the opening 43 and the position of the scanning line (gate wiring) 13 are limited by the position of the drain electrode DE, the amount of allowance by which the position of the opening 43 is allowed to deviate in the Y axis direction from the position of the scanning line (gate wiring) 13 is limited to an extremely small range.

In the layout shown in FIG. 21, one portion 144b of the region 144 surrounded by the opening 43 is overlapped with one portion of the scanning line (gate wiring) 13, when seen in its plan view. In this region 144b, since no lower electrode 24 exists, the area of the portion at which the scanning line (gate wiring) 13 and the lower electrode 24 are overlapped with each other can be reduced by increasing the area of this region 144b so that the parasitic capacitance between the scanning line (gate wiring) 13 and the lower electrode 24 can be reduced. However, since the area of the region 144b is not easily increased, it is difficult to reduce the parasitic capacitance. In the case when the parasitic capacitance cannot be sufficiently reduced, the image quality of a displayed image tends to deteriorate due to occurrence of flickers, or the like.

To prevent or suppress the occurrence of such an aperture ratio loss, or to sufficiently reduce the parasitic capacitance between the scanning line (gate wiring) 13 and the lower electrode 24, an arrangement is proposed in which the opening 43 to be formed on the lower electrode 24 is formed at a position that deviates from the position of the drain electrode DE.

However, in the manufacturing processes of the liquid crystal display device in accordance with the comparative example, as described above, upon forming the contact hole (opening) 27 by etching the inter-electrode insulating film 25, the cross-sectional shape of the contact hole (opening) 27 is prone to be the so-called reverse-tapered shape. Therefore, even in the case when the opening 43 to be formed on the lower electrode 24 is formed at a position that deviates from the position of the drain electrode DE, the cross-sectional shape of the contact hole (opening) 27 is prone to be the so-called reverse-tapered shape, making it difficult to reliably connect the upper electrode 26 and the drain electrode DE with each other electrically. In addition, in the case when the opening 43 to be formed on the lower electrode 24 is formed at a position that deviates from the position of the drain electrode DE, since the cross-sectional shape of the contact hole (opening) 27 becomes asymmetric to further easily cause a reverse-tapered shape, it becomes further difficult to reliably connect the upper electrode 26 and the drain electrode DE with each other electrically.

<Main Features and Effects of the Present Embodiment>

On the other hand, in the liquid crystal display device 10 of the present first embodiment, the upper electrode 26 and the drain electrode DE that is exposed to the bottom portion 27a of the contact hole (opening) 27 are electrically connected to each other via the island-shaped electrode 42. Moreover, the island-shaped electrode 42 and the lower electrode 24 are formed by using the same conductive film 46.

In the present first embodiment, after the hole (opening) 41 has been formed on the interlayer resin film (planarization film) 23, the lower electrode 24 has been formed thereon and the inter-electrode insulating film 25 has been formed thereon, the contact hole (opening) 27 is then formed. Moreover, on the edge portion 45 (see FIGS. 5 and 6) of the bottom portion 27a of the contact hole (opening) 27 to be formed, the island-shaped electrode 42 is sandwiched between the inter-electrode insulating film 25 and the interlayer resin film (planarization film) 23 so that the inter-electrode insulating film 25 and the interlayer resin film (planarization film) 23 are not directly made in contact with each other. With this structure, upon forming the contact hole (opening) 27, it is possible to prevent or suppress the interlayer resin film (planarization film) 23 from being scraped off (hollowed) together with the inter-electrode insulating film 25. Moreover, it is also possible to prevent or suppress the width dimension of the contact hole (opening) 27 from becoming larger toward the lower side to subsequently cause the reverse-tapered shape in the cross-sectional shape of the contact hole (opening) 27.

Moreover, upon forming the upper electrode 26, the upper electrode 26 is also deposited on the edge portion 45 (see FIGS. 5 and 6) of the bottom portion 27a of the contact hole (opening) 27. For this reason, it is possible to prevent or suppress an occurrence of a problem in which both of the upper electrode 26, formed on the side surface portion 27b (see FIGS. 5 and 6) of the contact hole (opening) 27, and the upper electrode 26, formed on the bottom portion 27a of the contact hole (opening) 27, are not connected with each other as one integral unit, that is, an occurrence of a so-called "step disconnection or step fault". As a result, it becomes possible to reliably connect the upper electrode 26 and the drain electrode DE with each other electrically, and to prevent degradation of the image quality of a displayed image, thereby making it possible to improve the performance of a liquid crystal display device.

Moreover, the island-shaped electrode 42 is formed by processes in which the conductive film 46 to form the lower electrode 24 is formed on the entire surface of the array substrate AR and the same conductive film 46 thus formed is subjected to a patterning process. With this arrangement, in the process for forming the lower electrode 24, the island-shaped electrode 42 can be formed simultaneously with the lower electrode 24 without the need for adding any new process. Moreover, since the island-shaped electrode 42 and the lower electrode 24 are formed by the same conductive film 46, the island-shaped electrode 42 and the lower electrode 24 are preferably formed by the same material.

In the liquid crystal display device 10 of the first embodiment, preferably, the contact hole (opening) 27 is formed at a position deviating from the hole (opening) 41 in a direction intersecting with the extending direction (X axis direction) of the scanning line (gate wiring) 13, that is, for example, along the extending direction (Y axis direction) of the signal line (source wiring) 14. With this arrangement, it is possible to increase the amount of allowance by which, when seen in its plan view, the position at which the opening 43 is formed on the lower electrode 24 is allowed to deviate along the Y axis direction from a position at which the light-shielding unit 31 is formed. Therefore, on the lower electrode 24, the opening 43 can be formed within a region that is overlapped with the light-shielding unit 31, when seen in its plan view. With this arrangement, it is possible to prevent or suppress the region 44 surrounded by the opening 43 from protruding in the positive direction in the Y axis direction, when seen in its plan view, relative to the light-shielding unit 31. Therefore, it is possible to reliably connect the upper electrode 26 and the drain electrode DE with each other electrically, while preventing or suppressing a reduction of the aperture ratio (aperture ratio loss) in the subpixel 12.

More preferably, as shown in FIG. 4, the opening 43 of the lower electrode 24 is formed in a manner so as to traverse the scanning line (gate wiring) 13, when seen in its plan view. By forming the opening 43 in such a manner as to traverse the scanning line (gate wiring) 13, it is possible to increase the area of the region 44b that is overlapped with the scanning line (gate wiring) 13 of the region surrounded by the opening 43, and consequently to reduce the area of the portion at which the lower electrode 24 and the scanning line (gate wiring) 13 are overlapped with each other. Thus, the upper electrode 26 and the drain electrode DE can be reliably connected with each other electrically, while reducing a parasitic capacitance between the lower electrode 24 and the scanning line (gate wiring) 13. As a result, it becomes possible to prevent or suppress the image quality of a displayed image from lowering due to an occurrence of flickers or the like, and consequently to improve the performance of a liquid crystal display device.

Second Embodiment

In first embodiment, the island-shaped electrode is formed on the drain electrode exposed to the bottom portion of the hole (opening) as well as on the side surface portion of the hole (opening). In contrast, in a second embodiment, although the island-shaped electrode is formed on the drain electrode exposed to the bottom portion of the hole (opening), it is not formed on the side surface portion of the hole (opening).

Figure 27:
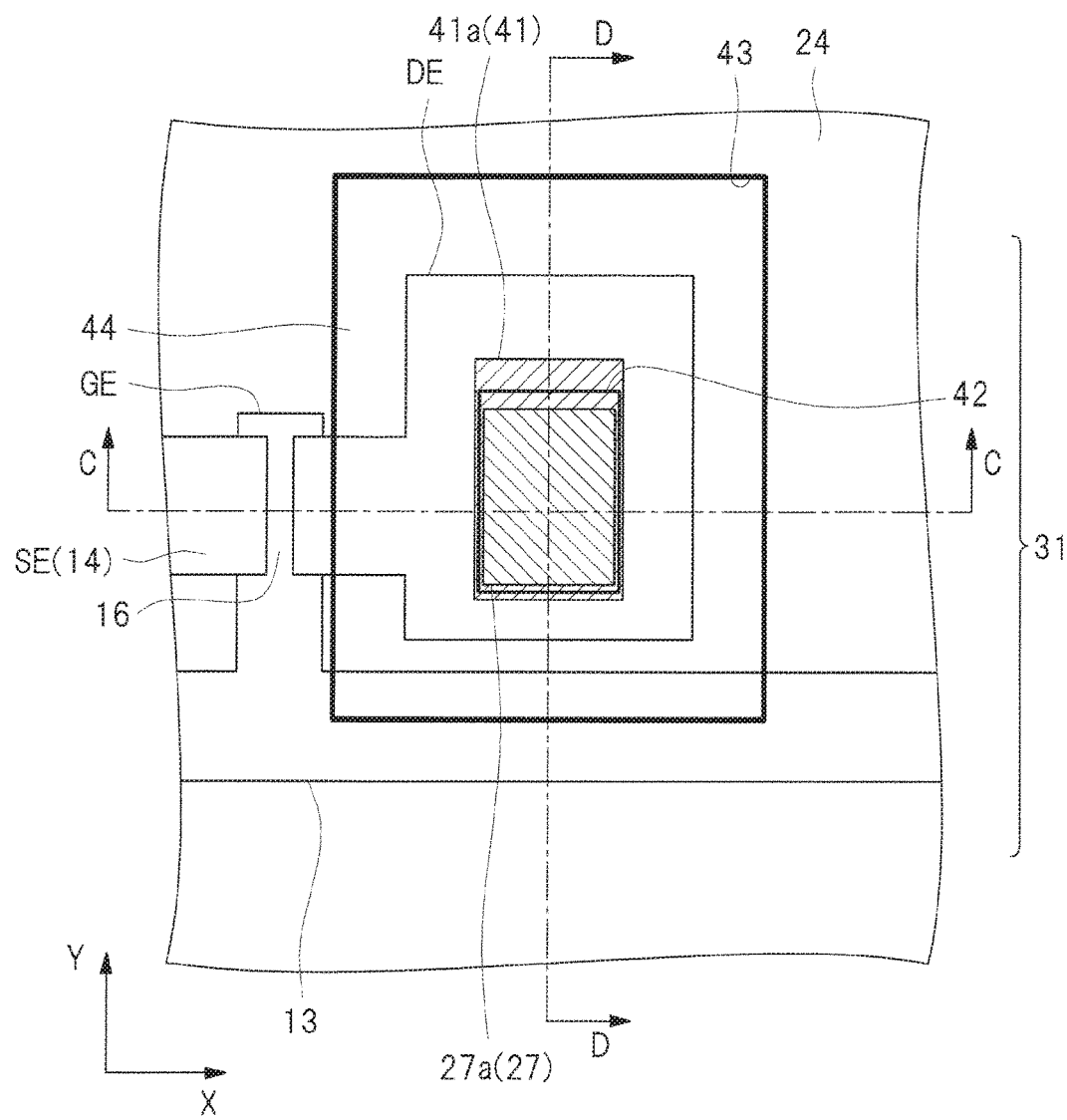
FIG. 27 is a plan view showing a part of one subpixel near a drain electrode in the liquid crystal display apparatus of a second embodiment in an enlarged manner.
Figure 28:
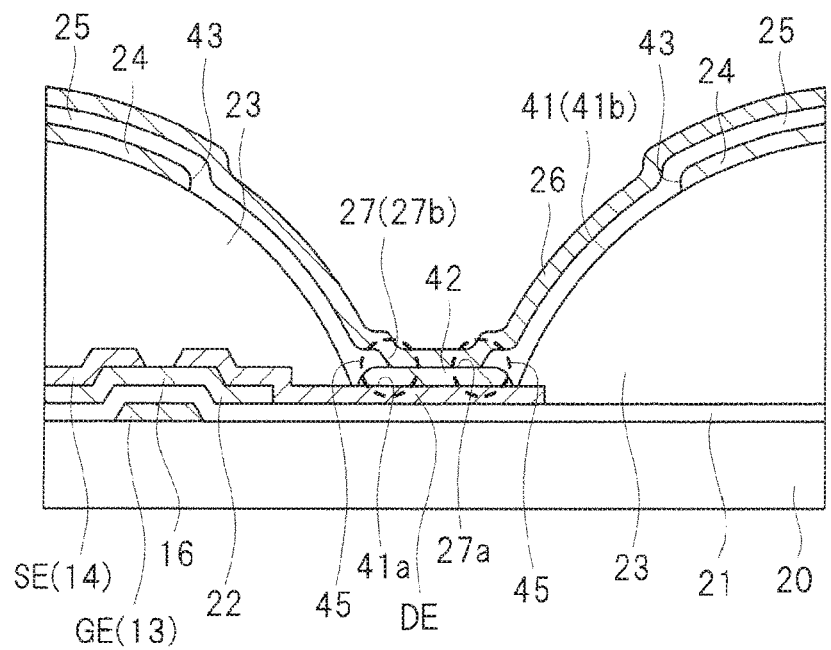
FIG. 28 is a cross-sectional view taken along the line C-C in FIG. 27.

FIG. 27 is a plan view that shows a portion near the drain electrode of one of the subpixels in a liquid crystal display device according to the second embodiment in an enlarged manner. FIG. 28 is a cross-sectional view taken along the line C-C in FIG. 27.

Figure 29:
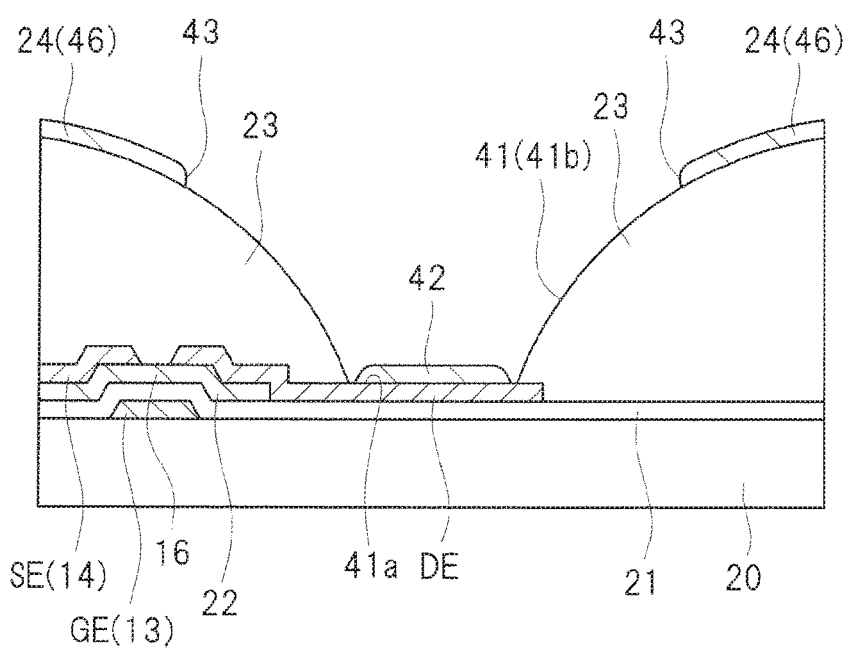
FIG. 29 is a cross-sectional view showing the principal part in the manufacturing process of the liquid crystal display apparatus of the second embodiment.
Figure 30:
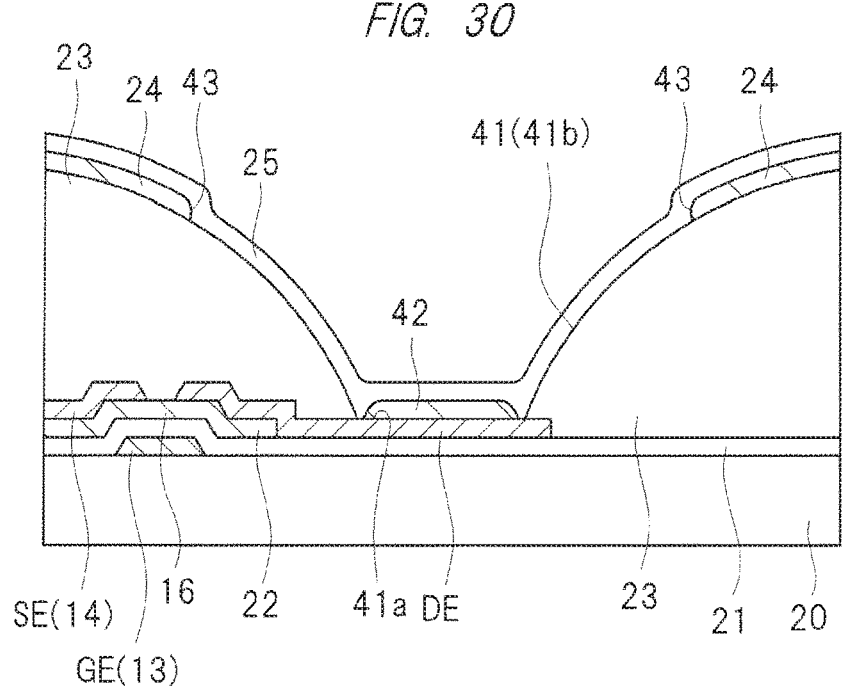
FIG. 30 is a cross-sectional view showing the principal part in the manufacturing process of the liquid crystal display apparatus of the second embodiment.
Figure 31:
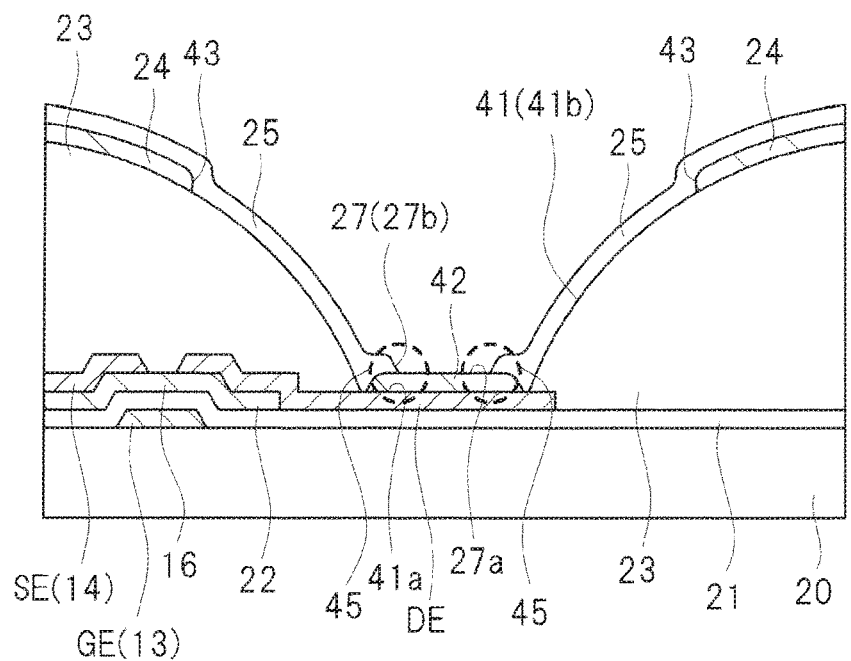
FIG. 31 is a cross-sectional view showing the principal part in the manufacturing process of the liquid crystal display apparatus of the second embodiment.

FIGS. 29 to 31 are cross-sectional views showing the principal part during manufacturing processes of the liquid crystal display device according to the second embodiment. FIGS. 29 to 31 show cross sections corresponding to the cross sections shown in the aforementioned FIG. 28.

Of a liquid crystal display device 10a of the second embodiment, those portions except for the portions near the drain electrode DE of one of the subpixels 12 are the same as those portions except for the portions near the drain electrode DE of one of the subpixels 12 of the liquid crystal display device 10 of the first embodiment; therefore, the explanations thereof will be omitted.

Moreover, to facilitate understanding, FIG. 27 illustrates a (perspective) state from which the color filter substrate CF is removed. Moreover, to facilitate understanding, FIG. 27 also illustrates a state in which, from the array substrate AR, the gate insulating film 21 (see FIG. 28), the semiconductor layer 22 (see FIG. 28), the interlayer resin film (planarization film) 23 (see FIG. 28), the inter-electrode insulating film 25 (see FIG. 28) and the upper electrode 26 (see FIG. 28) are removed (as a perspective view) so that the lower electrode 24 is seen on the uppermost surface. Moreover, to facilitate understanding, FIG. 27 also illustrates a peripheral portion of a bottom portion 27a of the contact hole (opening) 27 formed on the inter-electrode insulating film 25 (see FIG. 5).

As shown in FIGS. 27 and 28, in the liquid crystal display device 10a of the present second embodiment also, on the interlayer resin film (planarization film) 23, a hole (opening) 41 that penetrates the interlayer resin film (planarization film) 23 to reach the drain electrode DE is formed at a position that is overlapped with the drain electrode DE, when seen in its plan view. The drain electrode DE is exposed to the bottom portion 41a of the hole (opening) 41. On the drain electrode DE exposed to the bottom portion 41a of the hole (opening) 41, an island-shaped electrode 42 is formed. Moreover, when seen in its plan view, a lower electrode 24 is formed on the interlayer resin film (planarization film) 23 at a region separated from the bottom portion 41a of the hole (opening) 41.

On the other hand, in the present second embodiment, the island-shaped electrode 42 is formed inside a region exposed to the bottom portion 41a of the hole (opening) 41 of the upper surface of the drain electrode DE, when seen in its plan view.

In the manufacturing processes of the liquid crystal display device 10a of the present second embodiment, by carrying out the processes shown in FIGS. 7 to 12 in the same manner as in the manufacturing processes of the liquid crystal display device 10 of the first embodiment, the conductive film 46 is formed on the drain electrode DE exposed to the bottom portion 41a of the hole (opening) 41 as well as on the interlayer resin film (planarization film) 23.

Thereafter, in the present second embodiment, as shown in FIG. 29, a portion within a frame-shaped region 44 (see FIG. 27) of the conductive film 46 thus formed is removed by using a photolithography technique and etching. That is, of the conductive film 46, the portion inside the frame-shaped region 44 (see FIG. 27) is bored. At this time, the portion inside the frame-shaped region 44 (see FIG. 27) is bored such that, when seen in its plan view, the island-shaped electrode 42 is formed inside the region exposed to the bottom portion 41a of the hole (opening) 41 of the upper surface of the drain electrode DE.

By carrying out a patterning process on the conductive film 46 in this manner, as shown in FIGS. 27 and 29, a lower electrode 24 composed of the conductive film 46 is formed. Moreover, simultaneously with the formation of the lower electrode 24, an opening 43 is formed on the lower electrode 42 so that an island-shaped electrode 42 composed of the conductive film 46 is formed within the opening 43. At this time, the bottom portion 41a of the hole (opening) 41 is disposed within the opening 43, when seen in its plan view. With this arrangement, it is possible to prevent the lower electrode 24 (see FIG. 28) and the upper electrode 26 (see FIG. 28) from causing short circuiting electrically.

Next, as shown in FIG. 30, on the island-shaped electrode 42, on the lower electrode 24 as well as on the interlayer resin film (planarization film) 23 that is exposed to a region (frame-shaped region) 44 (see FIG. 27) between the island-shaped electrode 42 and the lower electrode 24, when seen in its plan view, an inter-electrode insulating layer 25 made of silicon nitride or the like is formed by, for example, a CVD method. That is, the inter-electrode insulating layer 25 is formed in a manner so as to cover the island-shaped electrode 42, the lower electrode 24 and the interlayer resin film (planarization film) 23 that is exposed to the region (frame-shaped region) 44 (see FIG. 27) between the island-shaped electrode 42 and the lower electrode 24, when seen in its plan view.

Next, a portion of the inter-electrode insulating film 25 on which the contact hole (opening) 27 has been formed is removed by using a photolithography technique and etching. Thus, as shown in FIGS. 27 and 31, a contact hole (opening) 27, which penetrates the inter-electrode insulating film 25 to reach the island-shaped electrode 42, when seen in its plan view, is formed. Moreover, the island-shaped electrode 42 is exposed to the bottom portion 27a of the contact hole (opening) 27.

Next, on the island-shaped electrode 42 as well as on the inter-electrode insulating film 25, an upper electrode 26 made of ITO, IZO or the like is formed by using, for example, a sputtering method. In other words, the upper electrode 26 is formed in a manner so as to cover the island-shaped electrode 42 and the inter-electrode insulating film 25. Thus, as shown in FIG. 28, the upper electrode 26 and the drain electrode DE are electrically connected with each other via the contact hole (opening) 27. That is, the upper electrode 26 and the drain electrode DE are electrically connected with each other via the island-shaped electrode 42.

In the present second embodiment, as shown in FIGS. 27 and 31, upon forming the contact hole (opening) 27, the bottom portion 27a of the contact hole (opening) 27 is disposed within a region in which the island-shaped electrode 42 is formed, when seen in its plan view. At this time, on an edge portion 45 of the bottom portion 27a of the contact hole (opening) 27, the island-shaped electrode 42 is sandwiched between the inter-electrode insulating film 25 and the interlayer resin film (planarization film) 23 so that the inter-electrode insulating film 25 and the interlayer resin film (planarization film) 23 are not directly made in contact with each other. By using such a structure, upon forming the contact hole (opening) 27, it is possible to prevent or suppress the interlayer resin film (planarization film) 23 from being scraped off (hollowed) together with the inter-electrode insulating film 25. As a result, it is possible to prevent or suppress the width dimension of the contact hole (opening) 27 from becoming larger toward the lower side to cause a reverse-tapered shape in the cross-sectional shape of the contact hole (opening) 27.

Moreover, as shown in FIG. 28, upon forming the upper electrode 26, the upper electrode 26 is also deposited on the edge portion 45 (see FIGS. 28 and 31) of the bottom portion 27a of the contact hole (opening) 27. For this reason, it is possible to prevent or suppress an occurrence of a problem in which the upper electrode 26, formed on the side surface portion 27b (see FIG. 28) of the contact hole (opening) 27, and the upper electrode 26, formed on the bottom portion 27a of the contact hole (opening) 27, are not connected with each other as one integral unit, that is, an occurrence of a so-called "step disconnection or step fault".

In other words, to prevent or suppress the occurrence of the "step disconnection or step fault", it is only necessary to form the island-shaped electrode 42 at least inside the region exposed to the bottom portion 41a of the hole (opening) 41 of the upper surface of the drain electrode DE.

Additionally, in the example shown in FIG. 27, the contact hole (opening) 27 is formed at the same position as that of the hole (opening) 41 along a direction (Y axis direction) intersecting with the extending direction of the scanning line (gate wiring) 13. In this case, the amount of allowance by which the position for use in forming the opening 43 is allowed to deviate in the Y axis direction from the position for use in forming the light-shielding unit 31 is not increased so much. Therefore, in comparison with the first embodiment, the effect for preventing or suppressing the reduction of the aperture ratio (aperture ratio loss) in each of the subpixels 12 and the effect for reducing the parasitic capacitance between the lower electrode 24 and the scanning line (gate wiring) 13 are small.

However, even in the case when the contact hole (opening) 27 is formed at the same position as that of the hole (opening) 41 along the direction (Y axis direction) intersecting with the extending direction of the scanning line (gate wiring) 13, it is possible to obtain the effect for preventing or suppressing the occurrence of the aforementioned so-called "step disconnection or step fault" of the upper electrode 26.

Third Embodiment

Next, the following description will explain an electronic device according to a third embodiment. In the first embodiment and second embodiment, a liquid crystal display device in which the upper electrode and the drain electrode are electrically connected with each other via an island-shaped electrode has been explained. In contrast, in the third embodiment, an explanation will be given on an electronic device that is provided with the liquid crystal display device explained in the first embodiment or second embodiment, by exemplifying a mobile phone.

Figure 32:
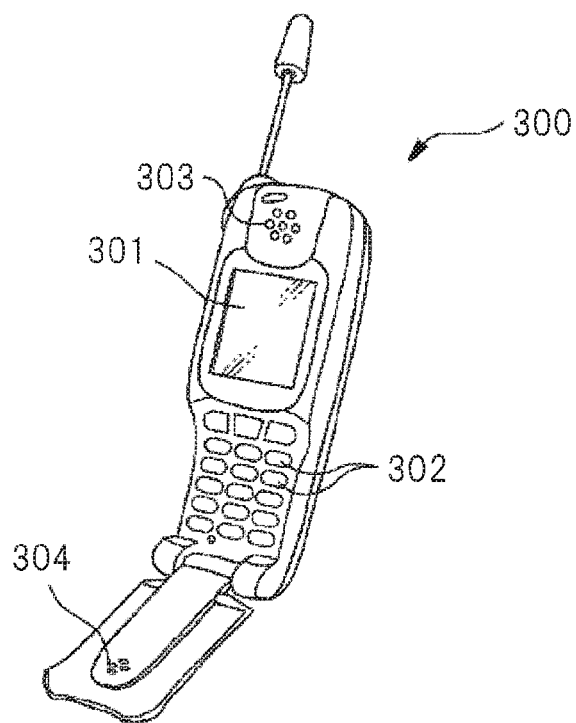
FIG. 32 is a perspective view showing a mobile phone as an example of an electronic device of a third embodiment.

FIG. 32 is a perspective view showing a mobile phone as one example of the electronic device according to the third embodiment.

As shown in FIG. 32, a mobile phone 300 includes the liquid crystal display device of the first embodiment or second embodiment as its display unit 301, and further provided with a plurality of operation buttons 302, an ear piece 303 and a mouthpiece 304.

For example, the liquid crystal display device 10 of the first embodiment or the liquid crystal display device 10a of the second embodiment may be used as the display unit 301. Thus, in the display unit 301, it is possible to prevent a so-called "step disconnection or step fault" from occurring on the upper electrode, and consequently to reliably connect the upper electrode and the drain electrode with each other electrically. In particular, when the liquid crystal display device 10 of the first embodiment is used as the display unit 301, it becomes possible to prevent or suppress the occurrence of an aperture ratio loss, or to sufficiently reduce the parasitic capacitance between the scanning line and the lower electrode, with the upper electrode and the drain electrode being reliably connected with each other electrically. Therefore, the performance of the mobile phone serving as an electronic device can be improved.

Additionally, those electronic devices provided with the liquid crystal display device 10 of the first embodiment or the liquid crystal display device 10a of the second embodiment as the display unit thereof are not limited to the above-mentioned mobile phone. The liquid crystal display device 10 of the first embodiment or the liquid crystal display device 10a of the second embodiment may be preferably used as a display unit for various apparatuses, such as, for example, electronic books, personal computers, digital still cameras, liquid crystal televisions, video tape recorders of a view-finder type or a monitor direct-viewing type, car navigation devices, apparatuses with a pager, and so forth. Moreover, the liquid crystal display device 10 of the first embodiment or the liquid crystal display device 10a of the second embodiment may be preferably used as a display unit for various electronic devices, such as electronic pocket notebooks, electronic calculators, word processors, work stations, television telephones (video phones), POS (Point of Sale) terminals, apparatuses provided with touch panels, and so forth. Thus, in any of these electronic devices, it is possible to prevent a so-called "step disconnection or step fault" from occurring on the upper electrode in the display unit, and consequently to reliably connect the upper electrode and the drain electrode with each other electrically. In particular, when the liquid crystal display device 10 of the first embodiment is used as the display unit, it is possible to prevent or suppress the occurrence of an aperture ratio loss, or to sufficiently reduce the parasitic capacitance between the scanning line and the lower electrode, with the upper electrode and the drain electrode being reliably connected with each other electrically. Therefore, the performance of the above-mentioned various electronic devices can be improved.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention is effectively applied to the liquid crystal display devices and the electronic devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
    a first substrate;
    a second substrate that is disposed so as to be opposed to the first substrate;
    a gate wiring provided on the first substrate along a first direction;
    a source wiring provided along a second direction intersecting with the first direction;
    a thin-film transistor provided at an intersection between the gate wiring and the source wiring;
    an organic insulating film formed on the thin-film transistor;
    a first opening that penetrates the organic insulating film;
    an island-shaped electrode that covers at least a part of an edge portion of a side surface portion and a bottom portion of the first opening;
    a common electrode formed on the organic insulating film and disposed so as to surround the first opening;
    an inorganic insulating film that covers the common electrode and the island-shaped electrode;
    a second opening that penetrates the inorganic insulating film; and
    a pixel electrode formed on the inorganic insulating film and electrically connected to the island-shaped electrode through the second opening,
    wherein a center of a bottom portion of the second opening is located at a position shifted from a center of a bottom portion of the first opening in the direction of the source wiring.

2. The liquid crystal display device according to claim 1, wherein an edge portion of the bottom portion of the first opening is covered by the inorganic insulating film.

3. The liquid crystal display device according to claim 2, wherein the edge portion of the bottom portion of the first opening includes a portion covered by the inorganic insulating film and a portion covered by the island-shaped electrode.

4. The liquid crystal display device according to claim 3, wherein the second opening is present within the bottom portion of the first opening.

5. The liquid crystal display device according to claim 4, wherein the second opening is formed from the bottom portion of the first opening over the edge portion of the bottom portion to reach the side surface portion of the first opening.

6. The liquid crystal display device according to claim 5, wherein the island-shaped electrode and the common electrode are made of the same material.

7. The liquid crystal display device according to claim 4, wherein the island-shaped electrode and the common electrode are made of the same material.

* * * * *